United States Patent [19]
van der Wal

[11] Patent Number: 5,359,674
[45] Date of Patent: Oct. 25, 1994

[54] PYRAMID PROCESSOR INTEGRATED CIRCUIT

[75] Inventor: Gooitzen S. van der Wal, Lawrenceville, N.J.

[73] Assignee: David Sarnoff Research Center, Inc., Princeton, N.J.

[21] Appl. No.: 805,149

[22] Filed: Dec. 11, 1991

[51] Int. Cl.$^5$ .......................................... G06K 9/36
[52] U.S. Cl. ................................................ 382/41
[58] Field of Search ............... 382/41, 49, 43, 27, 382/17, 54, 22; 358/160

[56] References Cited

U.S. PATENT DOCUMENTS

| | | | |
|---|---|---|---|
| 4,523,230 | 6/1985 | Carlson et al. | 358/167 |
| 4,561,024 | 12/1985 | Tamura | 358/451 |
| 4,602,273 | 7/1986 | Carlson | 358/11 |
| 4,603,350 | 7/1986 | Arbeiter et al. | 358/140 |
| 4,622,632 | 11/1986 | Tanimoto et al. | 395/800 |
| 4,663,660 | 5/1987 | Fedele et al. | 358/136 |
| 4,674,125 | 6/1987 | Carlson et al. | 382/49 |
| 4,692,806 | 9/1987 | Anderson et al. | 358/209 |
| 4,703,514 | 10/1987 | van der Wal | 382/41 |
| 4,709,394 | 11/1987 | Bessler et al. | 382/49 |
| 4,718,104 | 1/1988 | Anderson | 382/41 |
| 4,797,942 | 1/1989 | Burt | 382/41 |
| 4,887,257 | 12/1989 | Belloc et al. | 370/32.1 |
| 4,969,204 | 11/1990 | Melnychuck et al. | 382/56 |
| 4,992,868 | 2/1991 | Holtz | 358/135 |
| 5,168,375 | 12/1992 | Reisch et al. | 358/432 |

OTHER PUBLICATIONS

Gonzalez, Rafael C. and Wintz, Paul. "Digital Image Processing" 1977 pp. 336-338.
G. S. van der Wal et al. "Proceedings of SPIE Conference on Intelligent Robots and Computer Vision", Boston, Sep. 1985, pp. 300-305.
P. J. Burt et al. "The Laplacian Pyramid as a Compact Image Code" IEEE Trans. Comm. vol. Com-31, No. 4, Apr. 1983, pp. 532-540.

Primary Examiner—Michael T. Razavi
Assistant Examiner—Jon Chang
Attorney, Agent, or Firm—William J. Burke

[57] ABSTRACT

Multiresolution (pyramid) filtering is useful in image processing. An IC for implementing a variety of multiresolution filters includes a programmable, symmetric, and separable two-dimensional filter. The input signal to the filter can be an input signal applied to the IC or a combination of two such signals. Circuitry in the IC may be programmed to imply pixel values around the edges of the two-dimensional image signals processed by the filter. The filter provides an output signal as well as each of the unfiltered signals from a tapped delay line of a filter that combines successive lines of the image. The IC also includes an arithmetic and logic unit in which the filtered output signal may be combined with an unfiltered input signal or one of the unfiltered tap signals. If the filter is programmed to produce a Gaussian low-pass filtered image, this image, combined with image data from a center one of the filter taps produces a Laplacian function of the original image.

4 Claims, 12 Drawing Sheets

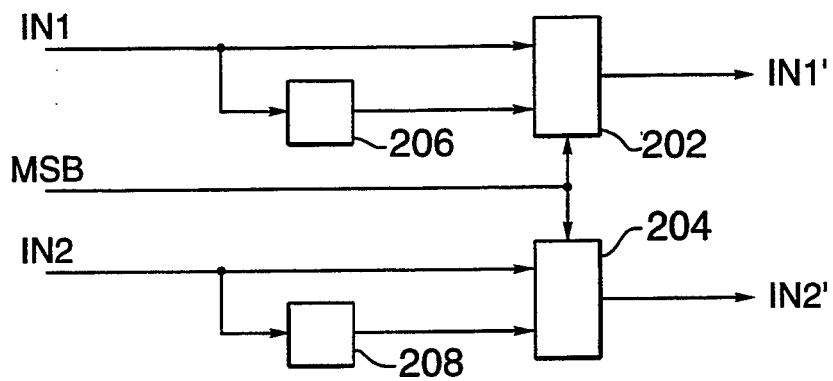
Fig. 2  INPUT DELAY
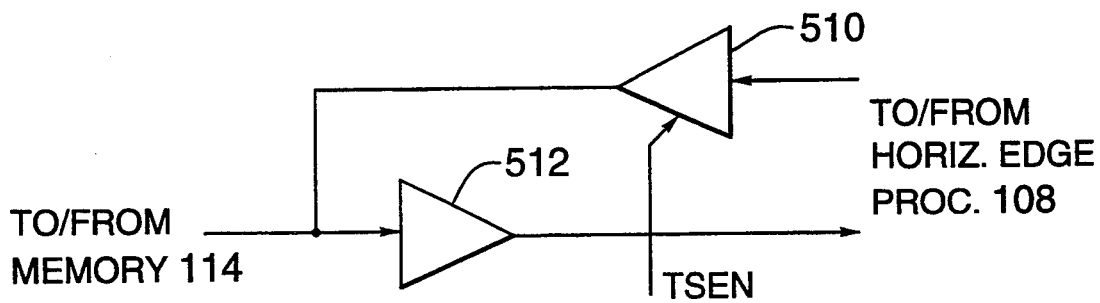
Fig. 5  THREE STATE GATE
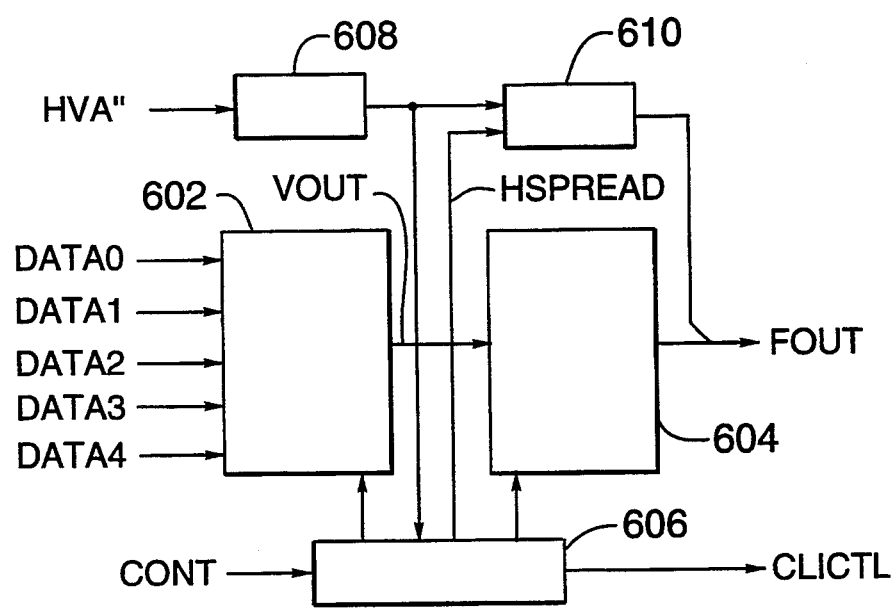
Fig. 6  CONVOLUTION PROCESSOR

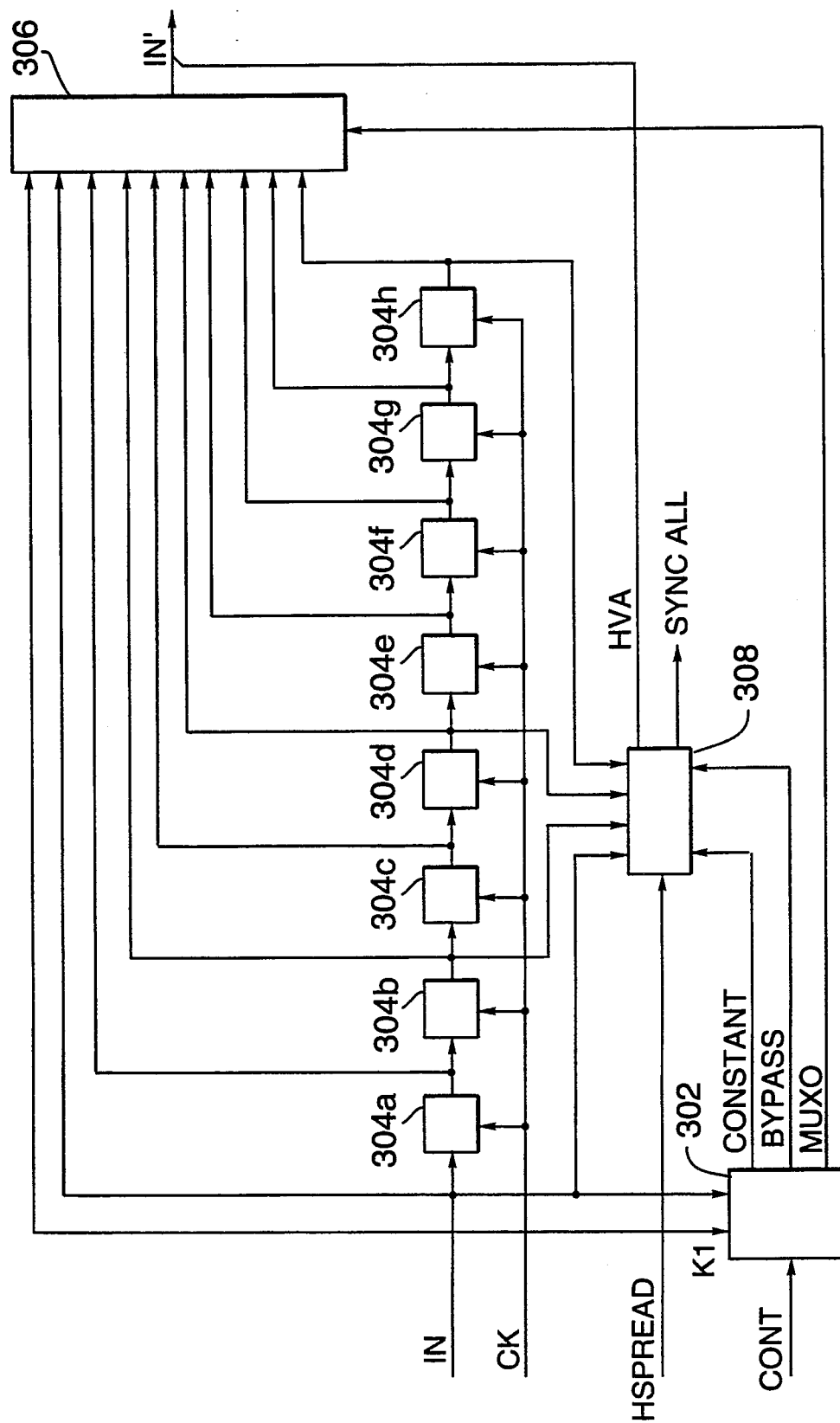

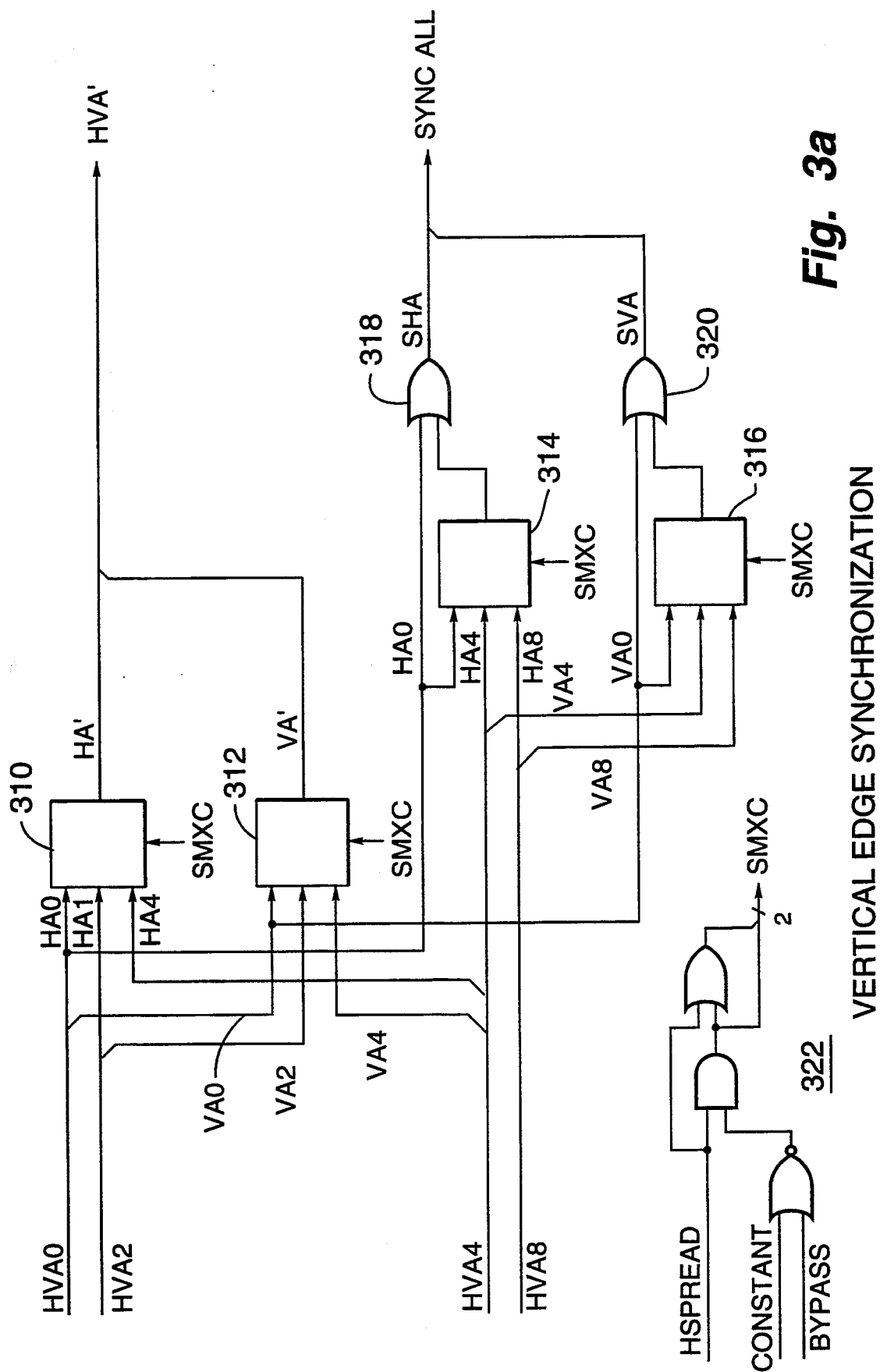

HORIZONTAL EDGE PROCESSOR

CLIP PROCESSOR

PYRAMID PROCESSOR INTEGRATED CIRCUIT

BACKGROUND OF THE INVENTION

The invention is an integrated circuit (IC) suitable for use in real-time multiresolution signal processing apparatus. The IC is useful for analyzing the contents and the frequency spectrum of an information bearing signal and for compressing the signal to represent the information it conveys in a more compact form.

Multiresolution or pyramid representation of data has been widely applied for processing image data for many applications such as image coding and surveillance. The technique has also been recognized as being applicable to other signals containing redundant information, such as audio signals.

Multiresolution image processing involves recursive or iterative generation of both high-pass filtered and a low-pass filtered components of data in a single or multi-dimensional space. For a multidimensional signal, a single step in this iterative procedure may, for example, apply the input signal to a multi-dimensional low-pass filter to generate the low-pass filtered output signal. This output signal may then be subtracted from the delayed input signal to produce the high-pass filtered output signal.

In an iterative or recursive application of this process, the high-pass filtered data is saved and the procedure described above is applied to the low-pass filtered output signal. This low-pass filtered signal can be represented by a smaller number of samples. If the samples of the high-pass filtered output signals were arranged in layers, with the first high-pass filtered signal on the bottom and successive high-pass filtered signals in increasingly higher layers, the resulting structure would resemble a triangle for one dimensional data or a pyramid for two dimensional data.

The high-pass filtered data sets resulting from this operation represents signal information in different bands of frequencies. For image data, these would be spatial frequencies while for audio data they would be audio frequencies.

As applied to image analysis, the high-pass filtered signals approximate the Laplacian of the image at respectively different levels of resolution. It is well known that data of this type is useful for finding and classifying details such as edges in an image (i.e. correlated data values) and for determining the level of noise in an image (i.e. uncorrelated data values). In addition, the spatial frequency information provided by the different levels of the pyramid may be used to identify objects in the image which have known spatial frequency spectra.

For image compression, the range of significant values represented by the high pass filtered image is substantially less than that represented by the unfiltered image. Thus, significant data reduction can be achieved by variably quantizing the high-pass filtered image data using, for example, a Huffman-type code. In addition, the low-pass filtered data may be represented by a smaller number of sample values than the original data. For a one-octave reduction in signal frequency, the number of samples needed to represent a low-pass filtered linear (one-dimensional) signal is one-half of that used for the original signal and one-quarter for a planar (two-dimensional) signal. For two-dimensional image data combined compression ratios of approximately 8:1 with very little loss in visual quality are common.

A system for pyramid processing is described in U.S. Pat. No. 4,674,125 to Carlson et al., incorporated herein by reference for its teachings on multiresolution signal processing techniques. Carlson et al.'s system is a pipelined digital signal processing system which filters images through multiple pyramid stages in real time with a delay. That system, however, may be relatively expensive and difficult to implement. For example, the two-dimensional low-pass filters used in this system each use multiple digital multiplier circuits. These circuits have a relatively large number of components and, thus, are relatively expensive. In addition, the designer of such a circuit would need to closely control the propagation delays through each filter stage in the pipeline so that the signal could presented to the following stage within the timing constraints appropriate for that circuit. This attention to timing details can add significant complexity to the circuit design.

Another pyramid processing system is described in U.S. Pat. No. 4,703,514 to G. van der Wal, incorporated herein by reference for its teachings on multiresolution signal processing techniques. van der Wal's system may be used to implement a pyramid processor in a single-stage non-real-time system or in a multi-stage delayed real-time system. The filter shown in van der Wal's FIG. 3, includes a filter logic unit module having an m by m two-dimensional digital filter and supporting circuitry which accepts two input signals and provides two output signals. This module may be programmed to simultaneously provide a Laplacian high-pass filtered image and a Gaussian low-pass filtered image of a single input signal. Since this circuit has two input terminals, and programmable filter coefficients, it may also be used to combine Laplacian images produced by a pyramid analyzer to regenerate the original image.

While this system is more flexible than the system disclosed by Carlson et al., it has many of the same problems. It uses the same two-dimensional filter as the Carlson et al. system and is subject to the same timing constraints. Thus, any multi-stage filter implemented using van der Wal's approach is likely to be complex and relatively expensive. The IC disclosed herein performs similar functions to van der Wal's system in a less complex and less expensive way with added functionality.

SUMMARY OF THE INVENTION

The invention is multiresolution signal processing circuitry which has been simplified so that it may be implemented as a single IC. The circuitry includes a filter and is configured to accept input signals having imbedded timing signals. These timing signals are propagated through the circuitry with compensating delays to match the delays of the data signals. These propagated timing signals are imbedded in the output signals. In this configuration, multiple signal processing circuits may be coupled in cascade to produce a multi-stage pyramid processing system without complex external timing circuitry.

The filter may be programmed to use filter coefficients from a limited set of values. These values are selected so that the filter uses shift-and-add multiplication techniques to scale the input samples by these filter coefficients. The filter coefficients may be switched at the sample rate and line rate, allowing the filter to apply respectively different frequency response characteristics to alternate data values and may be symmetric or antisymmetric. The filter may be configured to have an even number of taps or an odd number of taps. The filter may also be configured to operate on every other sample value, thereby effectively doubling the size of its kernel. The filter includes circuitry which allows a variety of different types of values to be implied in the areas beyond the edges of the image to be filtered. In addition, multiple circuits may be coupled in parallel to provide higher discrete signal resolution than is provided by a single circuit.

BRIEF DESCRIPTION OF THE DRAWING

In the Drawing, line arrows represent signal paths conveying multiple-bit parallel digital signals or connections carrying analog signals or single-bit digital signals.

FIG. 2 is a block diagram of input delay circuitry for use in the IC of FIG. 1.

FIG. 3 is a block diagram of vertical edge processor for use in the IC of FIG. 1.

FIG. 3a is a logic diagram of a vertical edge synchronizer for use in the processor of FIG. 3.

FIG. 5 is a logic diagram of a three-state circuit for use in the IC of FIG. 1.

FIG. 6 is a block diagram of a convolution processor for use in the IC of FIG. 1.

DETAILED DESCRIPTION

Figure 1:
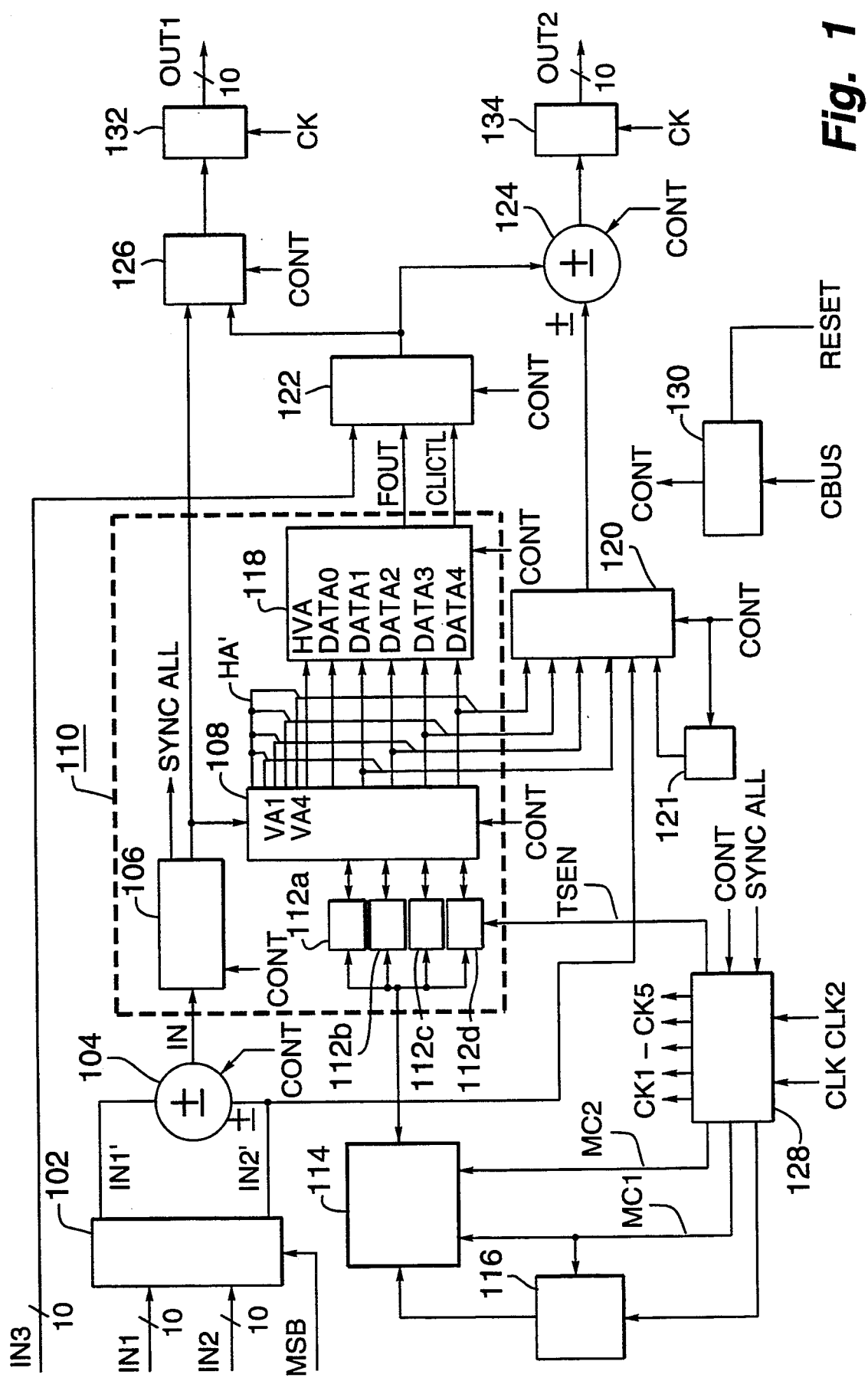
FIG. 1 is a block diagram of multiresolution signal processing IC of the invention.

The invention is described below with reference to an exemplary pyramid IC and to FIGS. 1–11. While this description is in the context of an image processing system, the circuitry may be used for other types of one-dimensional and two-dimensional multiresolution filtering applications.

The pyramid IC accepts up to three digitized input signals and provides up to two output signals. The input and output data channels incorporate timing signals which control the pipelined processing. These timing signals are automatically adjusted to the processing delay of the IC, allowing for automatic delay control in pipelined systems. The effective lengths of the horizontal delay lines used to implement a two-dimensional filter are controlled by the timing signals and, thus, do not need to be programmed. This IC can accept and process signals having continuously variable horizontal and vertical blanking times. The IC includes programmable edge control which can be used to separately extend the data at all edges of the image by two or four pixels.

The digital data signal may be generated from a sensor or from an analog to digital converter. For an image obtained from a video camera, the horizontal and vertical sync signals provide the timing signals. These signals are digitized in an auxiliary device such as a counter and then combined with the digital data signal to produce the input signal. Alternatively the digital data signal may be generated by a frame store in which case the timing signal is added by the frame store or an auxiliary device.

The two-dimensional filter used in the IC has a separable kernel; it can be treated as a combination of separate horizontal and vertical filters. The five vertical and five horizontal filter coefficients are programmable within a limited set of values and may be either symmetric or antisymmetric. In addition, the filter may be configured to have either an odd or an even number of taps.

The IC has two parallel paths which may be used to simultaneously calculate a Gaussian low-pass filtered image and a Laplacian function (the difference of the input image and the Gaussian) of the input image. The two parallel paths are also used for computing the inverse pyramid transforms.

Multiple pyramid ICs may be cascaded to implement multistep filters. Specially programmable delays and I/O functions allow a relatively large number of possible configurations to be implemented without external circuitry such as extra delay lines or timing circuitry. The IC may be programmed to operate in a "spread-tap" mode. This causes the five-by-five tap filter to expand to an nine-by-nine tap filter by effectively inserting zero-valued coefficients between successive ones of the five horizontal and five vertical coefficients.

The IC operates on eight-bit input images (signed or unsigned) and generates a sixteen-bit result. Two ICs can be connected in parallel so that sixteen-bit image data can be processed to produce a full sixteen-bit output signal.

FIG. 1 is a block diagram of an exemplary pyramid IC of the invention. The IC is designed to function as an element of a multiresolution filter. The filter can accept up to three input signals, IN1, IN2 and IN3, and provide up to two output signals, OUT1 and OUT2. Each of these signals is a multibit digital signal containing at least eight data bits and two timing bits.

Figure 1A:
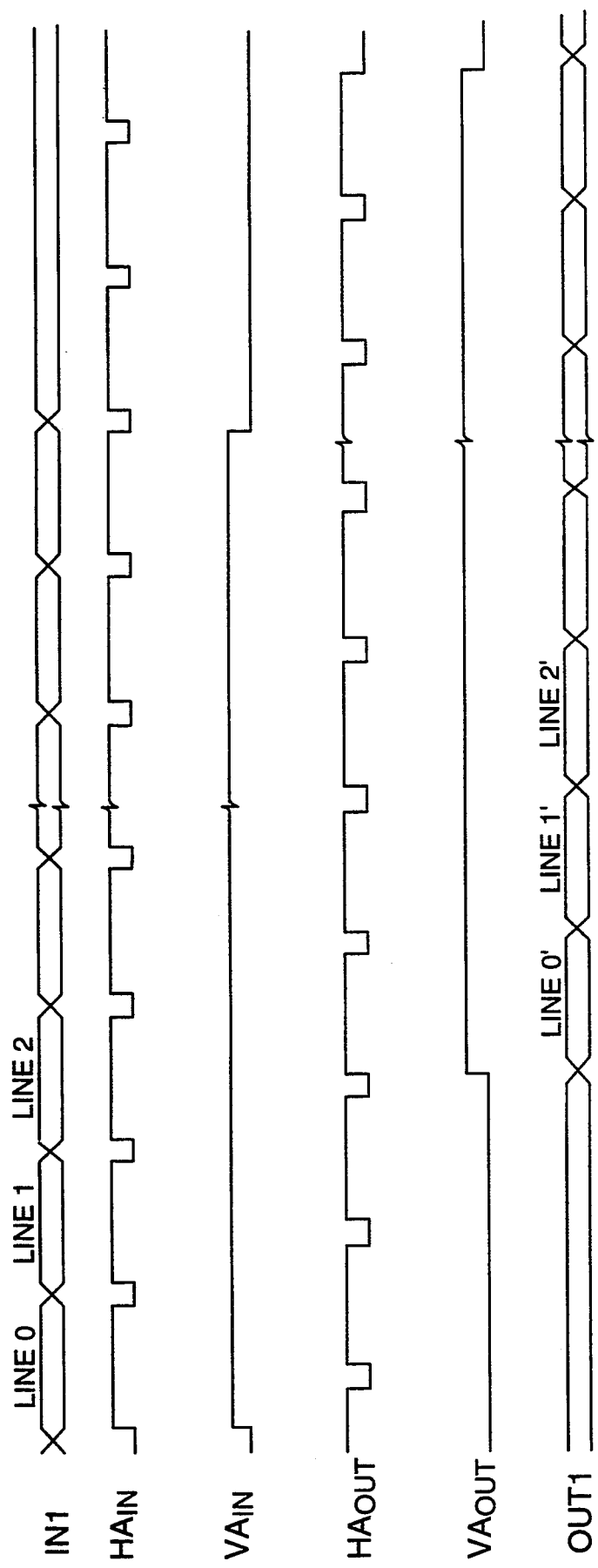
FIG. 1a is a timing diagram useful for explaining the operation of the IC of FIG. 1.

The two timing bits convey respective timing signals. One signal, HA, is in a logic high state when the data in a line is valid (i.e. during the active picture interval) and in a logic low state otherwise (i.e. during the horizontal blanking interval). The other signal, VA, is in a logic high state when the data in a field is valid and in a logic low state otherwise (i.e. during the vertical blanking interval). FIG. 1a is a timing diagram which illustrates the relative timing of data signal, and the signals HA and VA.

The IC shown in FIG. 1 includes five principal elements: an input arithmetic and logic unit (ALU) 104, a filter 110 (shown within the dashed line in FIG. 1), a multiplexer 120, a clip processor 122 and an output ALU 124. Signals IN1 and IN2, equally delayed by an input delay element 102 are combined by the ALU 104 to generate a signal, IN, for application to the filter 110. This signal may be one of the signals IN1 or IN2, or it may be their sum (IN1+IN2) or their difference (IN1−IN2).

The filter 110 processes the signal provided by the ALU 104 through a two dimensional filter which may be configured to have between one and five taps in each of its two dimensions. The filter includes a vertical edge processor 106 and a horizontal edge processor 108 which allow a variety of different types of pixel values to be implied as surrounding the actual image data. Among these are a constant value or a repeat of the first or last horizontal or vertical line.

A memory 114 provides a four or eight-line delay for the vertical portion of the two-dimensional filter. The delayed lines are combined both vertically and horizontally in the convolution processor 118 to complete the filter 110. The output signal provided by the filter 110 is processed by clip processor 122 which performs rounding and scaling for single precision signals and combines the filtered data as the more significant bit (MSB) positions with filtered data representing the less significant bit (LSB) portions, provided via input IN3, to generate double-precision output signals.

The output signal of the processor 122 or the output signal of the ALU 104, as processed by the processor 106, may be selected as the output signal OUT1. The output signal OUT2 may be the output signal of the dip processor 122 or the output signal of the multiplexer 120 or the output of the ALU 124 combining these two signals. The signal provided by the multiplexer 120 may be either a constant value, K2, the input signal IN2 or one of the delayed horizontal line signals provided by the horizontal edge processor 108. The multiplexer 120 includes internal compensating delays (not shown) which align each of the input signals to the signal provided by the clip processor 122. Timing signals for the IC are generated by timing circuitry 128 which produces a two-phase memory dock and a system clock signal CK from a two phase input clock signal, CLK and CLK2.

The IC functions are controlled via control circuitry 130 which accepts user commands from a control input channel CBUS and provides control signals and data values to the other components of the IC via an output port CONT.

Pyramid ICs such as that shown in FIG. 1 may be configured to realize several types of multiresolution filters.

FIG. 2 is a block diagram of an input delay element 102 which includes two multiplexers, 202 and 204, which are responsive to an externally supplied signal MSB to selectively delay the signals IN1 and IN2 by three periods of the system clock signal CK to produce output signals IN1' and IN2'. The delay is imparted via the delay elements 206 and 208.

The signal MSB is used when two ICs of the type shown in FIG. 1 are configured to process 16-bit image data. The signal MSB is in a logic high state for the IC that is filtering the eight more significant bits and in a logic low state for the pyramid IC that is filtering the eight less significant bits of a sixteen-bit image data signal. Thus, responsive to the signal MSB, the input signal of the IC processing the MSB portion of the image data is delayed by three clock periods more than the input signal representing the LSB portion of the image.

In FIG. 1, the output signals, IN1' and IN2' of the input delay element 102, which each include respective horizontal active and vertical active timing signals, are applied to respectively different input ports of an ALU 104 which produces a signal IN. Here the ALU 104 is a programmable adder/subtracter. The ALU 104 is responsive to a two-bit control signal which is part of a signal CONT provided by the control circuitry 130. The control signal determines how the input signals IN1' and IN2' are combined to generate the signal IN. Table 1 shows the possible combinations. Additional one bit control signals are typically applied to ALU 104 to provide scaling of the data by X or 0.5 X and enabling or disabling the clipping of overflow or underflow data.

TABLE 1

| CONT | IN |
|---|---|
| 0 | IN1' |
| 1 | IN2' |
| 3 | IN1' + IN2' |
| 4 | IN1' − IN2' |

The signal IN includes the timing signals HA and VA delayed to compensate for any processing delay through the ALU 104. The signals IN1 and IN2 are desirably aligned so that their horizontal and vertical timing signals are closely synchronized. FIG. 1a is a timing diagram which illustrates the relationship between the various horizontal active and vertical active timing signals and their respective image data signals. The timing signals associated with the signal IN are the logical OR of the respective timing signals associated with the input signals IN1' and IN2', when IN is a function of both IN1' and IN2'.

This timing restriction could be relaxed by interposing variable delay elements (not shown) between the input signals IN1 and IN2 and the input ports of the delay element 102. These variable delay elements may, for example, automatically detect any skew between the two signals IN1 and IN2 and provide compensating delay to the leading signal to match its timing to that of the lagging signal. The skew may be detected, for example, by starting a counter (not shown) in response to a transition of the timing signal component of one signal and stopping the counter in response to a transition the timing signal component of the other signal. The signal having the first transition would then be delayed by a time interval proportional to the counter value to match its timing to that of the signal having the later transition.

The signal IN from ALU 104 is applied to processor 106 which is shown in detail in FIGS. 3 and 3a. The processor 106 allows the user to specify pixel values to be used as a border beyond the left and fight edges of the image so that the 5×5 filter has defined input data at the edges of the image. Each of these borders may be separately specified. These pixel values may either be a constant value or a repeat of the edge pixel values for each line. The processor 106 may be programmed to provide zero, two or four extra pixel values on each side of the image. Four extra pixel values are only provided when the filter is operated in "spread-tap" mode. In addition, the circuitry expands the vertical and horizontal timing signals to accommodate the extra pixels.

For pyramid filter operations, the border pixel values may be very important, since the border can influence most of an image at a low resolution level of the pyramid. In standard edge control, the pyramid IC extends the image size by repeating the vertical edge information of the image (i.e. repeating the edge pixels). For some images, however, it is desirable to set the border of the image to a constant value. An example of this type of image would be a mosaic of smaller images in which pyramid operations are performed on each of the smaller images individually. If constant pixel values are used for the borders, the individual images can be combined by addition to produce the final image. In alternative forms of edge control, the data is mirrored at the edge or data is extrapolated from the edge.

In FIG. 3, the signal IN from the ALU 104 is applied to a tapped delay line which includes eight delay elements, 304a through 304h, each of which delays the signal by one period of the system clock signal CK. The input signal IN and the output signal of each delay element are applied to separate input ports of a multiplexer 306. A constant value K, provided by control circuitry 302, is applied to another input port of the multiplexer 306. In response to a control signal, MUXC, the multiplexer 306 passes one of the signals applied to its input ports as the signal, IN'. This is the output signal of the processor 106.

The processor 106 operates as follows. When the horizontal active (HA) timing signal of the signal IN has a logic-low value, the control circuitry 302 conditions the multiplexer 306 to pass the constant value K1 as the signal IN'. When the control circuitry 302 detects a positive going transition, indicating that valid pixel data is being applied to the delay element 304a, it conditions the multiplexer 306 to pass the signal IN as the output signal IN'.

The value K1 is provided in the horizontal blanking times if the control signal CONT, applied to the control circuitry 302, indicates that a state variable CONSTANT has been set to logic-high and provides a value for K1. If a state variable BYPASS is in the logic-high state, then the MUX is always set to select IN, thereby eliminating the function of the vertical edge processor. In another mode, the constant value K1 is selected to be the input at all times. No special timing adjustments need to be made when BYPASS is active or K1 valued pixels are used for the borders, since these are provided in the horizontal and vertical blanking times.

If, however, the image border is to be made by repeating the first pixel value, for example, four times (i.e. in spread tap mode), the control circuitry 302 conditions the multiplexer 306 to supply the input signal IN, followed by the output signals of the delay elements 304a, 304b, 304c and 304d during successive clock periods. The multiplexer 306 then continues to provide the signal from the delay element 304d until a time, four clock periods after the negative-going transition of the signal HA is detected by the control circuitry 302. Then, the circuitry 302 conditions the multiplexer 306 to repeat the last pixel value by successively providing the output signals of the delay elements 304e, 304f, 304g and 304h.

A vertical edge synchronizer 308 receives the horizontal and vertical timing signal component of the input signal IN and of each of the delayed horizontal and vertical timing signals provided by the delay elements 304b, 304d and 304h. From these signals and from signals provided by the control circuitry 302, the vertical edge synchronizer produces two two-bit timing signals: HVA and SYNC ALL. HVA includes the horizontal and vertical timing signals for the signal IN' provided by the multiplexer 306. These signals are the horizontal and vertical active timing signals for the input signal IN, delayed to compensate for signal delays caused by adding border pixels. The signal SYNC ALL extends the horizontal and vertical timing signals to encompass the added pixel values. This signal is used elsewhere in the IC to process the added edge values.

In FIG. 3a, a vertical edge synchronizer, includes four multiplexers and assorted logic circuitry. Multiplexer 310, under control of a two-bit control signal SMXC, passes the horizontal active signal from either the input signal IN (HA0), the output signal of the delay element 304b (HA2) or the output signal of delay element 304d (HA4) as the output signal HA'. Similarly, the multiplexer 312 passes one of the corresponding vertical active signals VA0, VA2 or VA4 as the output signal VA', also responsive to the signal SMXC.

The signal SYNC ALL includes a horizontal active signal, provided by multiplexer 314 and OR gate 318, and a vertical active signal, provided by multiplexer 316 and OR gate 318. Multiplexer 314 passes one of the signals HA0, HA4 and HA8 responsive to the signal SMXC, where the signal HA8 is the horizontal active timing signal provided by the delay element 304h. The OR gate forms a signal SHA which is the logical OR of the signal HA0 and the output signal of the multiplexer 318. The multiplexer 316 and OR gate 320 are configured in the same manner to produce a signal SVA, the vertical active component of the signal SYNC ALL, by combining the signals VA0, VA4 and VA8.

The output signal SMXC of the logic circuitry 322 is a logical combination of three control signals: HSPREAD, CONSTANT and BYPASS. The signal HSPREAD is in a logic high state when the spread-tap mode of operation has been selected for the filter. In this mode, the IC effectively inserts zero-valued coefficients alternately among the five vertical and five horizontal coefficients to implement a nine-by-nine filter kernel. The signal CONSTANT is logic-high when the constant value K1 is to be used as the border pixel value for the image and the signal BYPASS is logic-high when no border pixels are to be used. TABLE 2 illustrates the relationship between the signals HSPREAD, CONSTANT and BYPASS, and the output signals HA, VA, SHA, and SVA.

TABLE 2

| HSPREAD | CONSTANT | BYPASS | HA' | VA' | SHA | SVA |
|---|---|---|---|---|---|---|
| 0 | 0 | 0 | HA2 | VA2 | HA0+HA4 | VA0+VA4 |
| X | X | 1 | HA0 | VA0 | HA0 | VA0 |
| X | 1 | X | HA0 | VA0 | HA0 | VA0 |
| 1 | 0 | 0 | HA4 | VA4 | HA0+HA8 | VA0+VA8 |

In TABLE 2, "X" means either logic-high (1) or logic-low (0), that is to say, a "don't care" condition, and the operation "+" indicates a logic OR operation.

In FIG. 1, the signal IN' produced by the vertical edge processor is applied to a multiplexer 126 and to processor 108. The signal applied to the multiplexer 126 may be applied directly to the output port OUT1 of the IC responsive to a portion of the signal CONT provided by the control circuitry 130. The operation of the control circuitry 130 is described in greater detail below.

The processor 108 processes the input signals to effectively add lines of border pixels to the image at the top and bottom edges. In addition, it acts in concert with three-state gates 112a–112d and a memory 114 to implement a tapped delay line which is used to provide four line-delayed image signals to the vertical filter portion of the convolution processor 118. The processor 108 is described below in reference to FIGS. 6, 6a and 6b.

Figure 4:
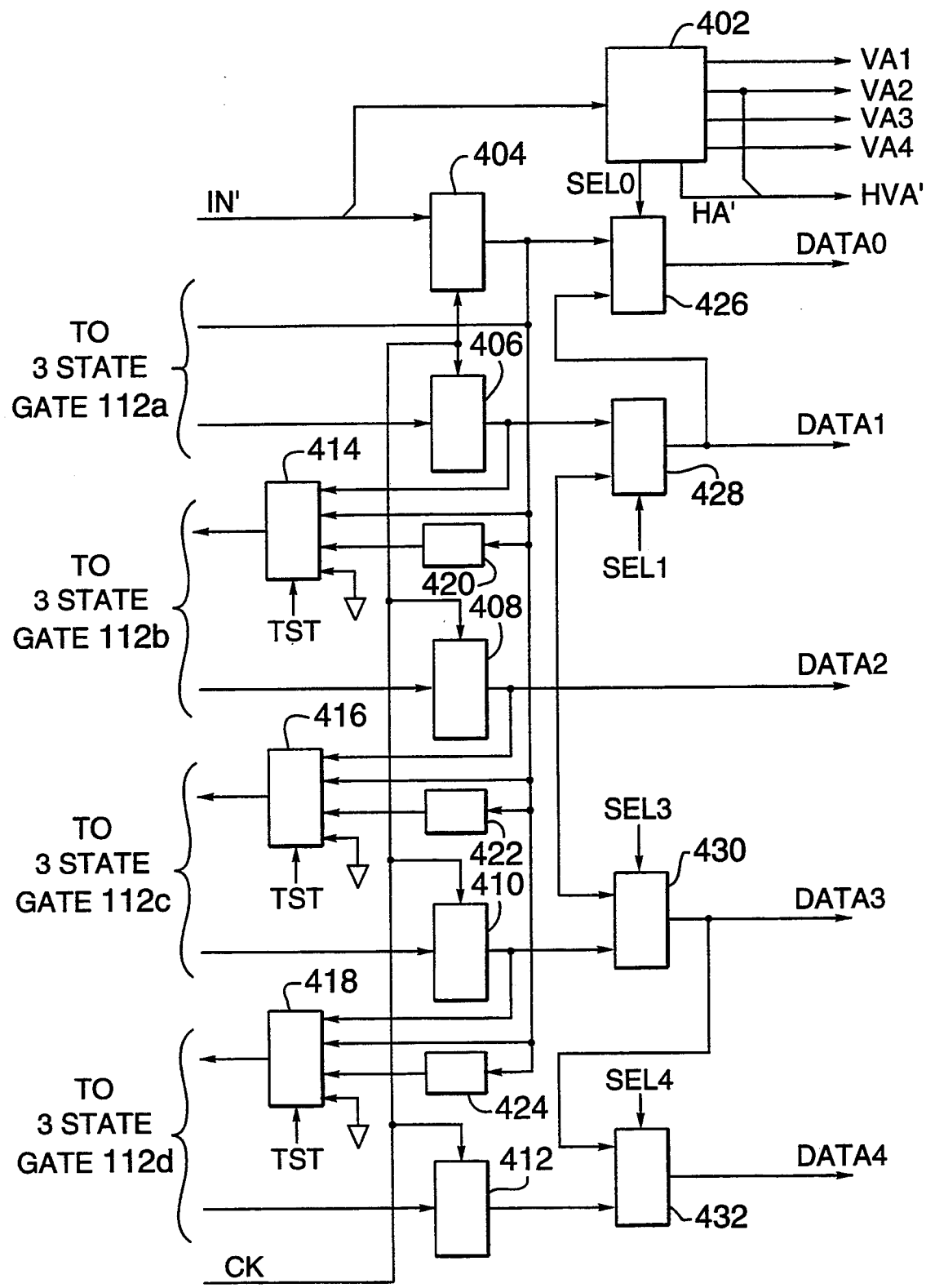
FIG. 4 is a block diagram, partly in schematic diagram form, of horizontal edge processor for use in the IC of FIG. 1.
Figure 4A:
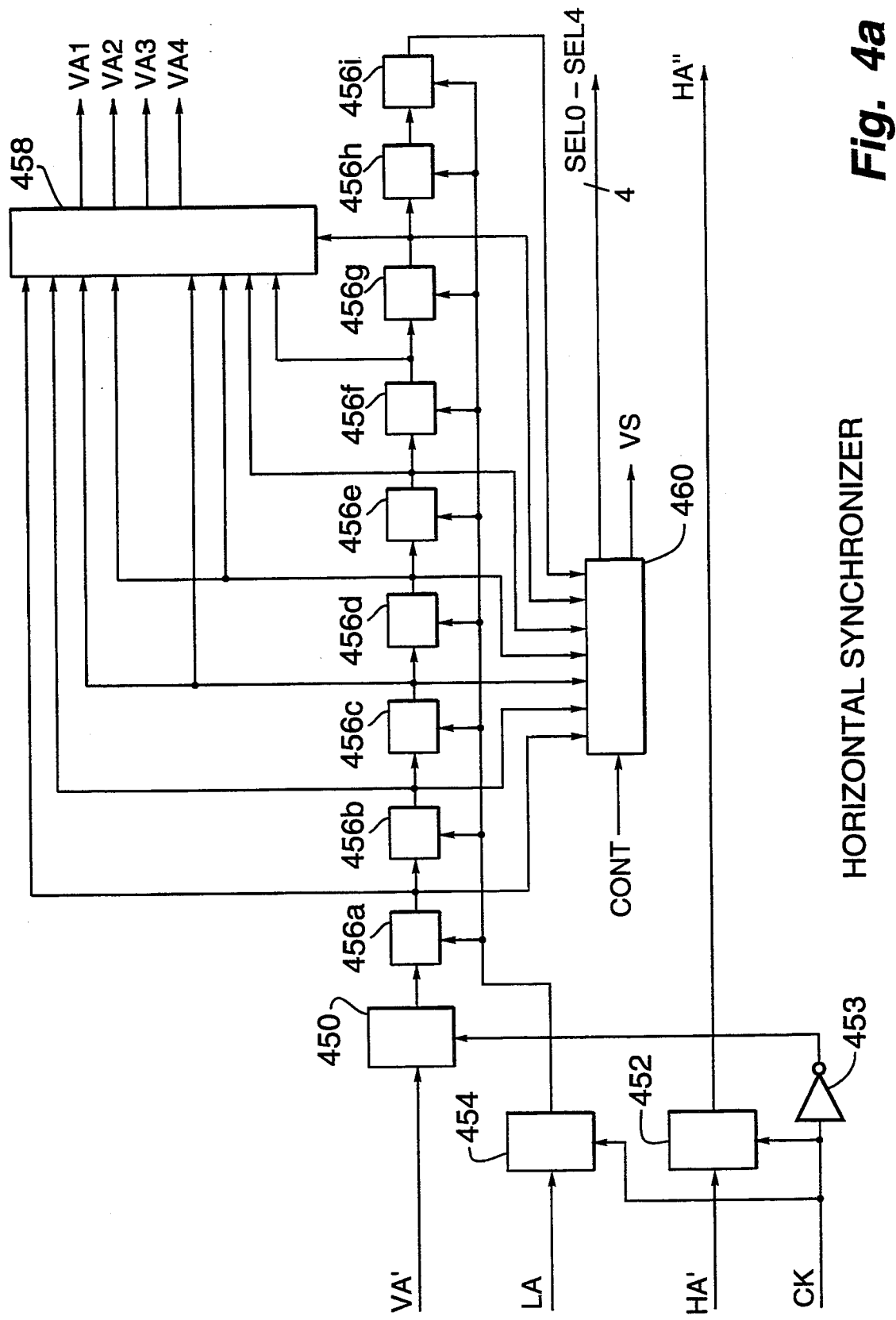
FIG. 4a is a block diagram of a horizontal edge synchronizer for use with the processor of FIG. 4.

FIGS. 4 and 4a are block diagrams of circuitry suitable for use as the processor 108. To better explain this circuitry reference is also made to the memory 114 and address counter 116 in FIG. 1 and to the three-state gates 112a–112d shown in FIGS. 1 and 5.

In FIG. 4, the eight-bit data portion of the signal IN' provided by the processor 106 is applied to an eight-bit synchronous register 404 while the timing signals, HA' and VA' are applied to horizontal synchronizer circuitry 402. The circuitry 402 is described below in detail with reference to FIG. 4a.

Figure 6A:
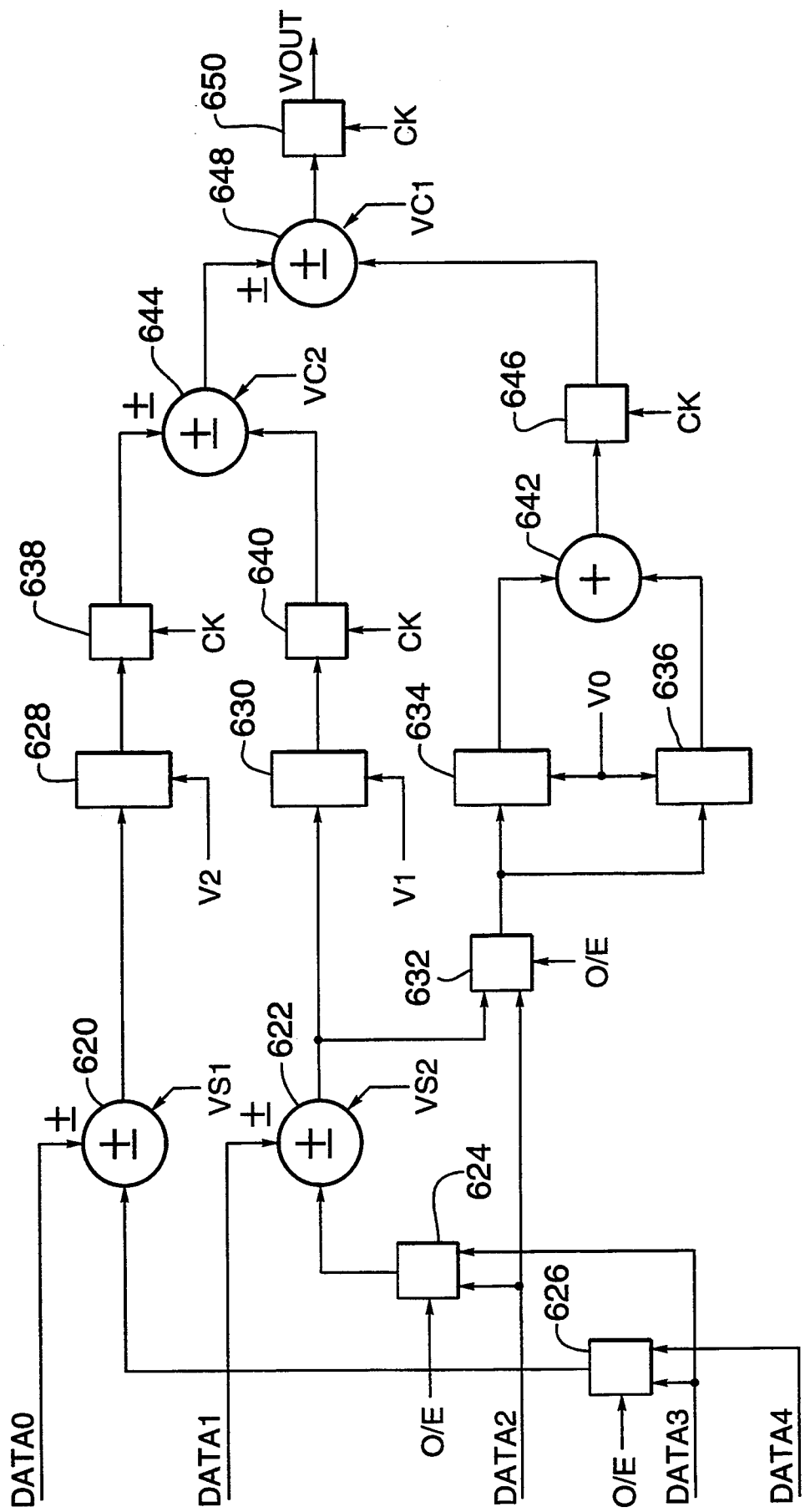
FIGS. 6a and 6b are block diagrams of a vertical filter and a horizontal filter, respectively, which are for use in the processor of FIG. 6.
Figure 6B:
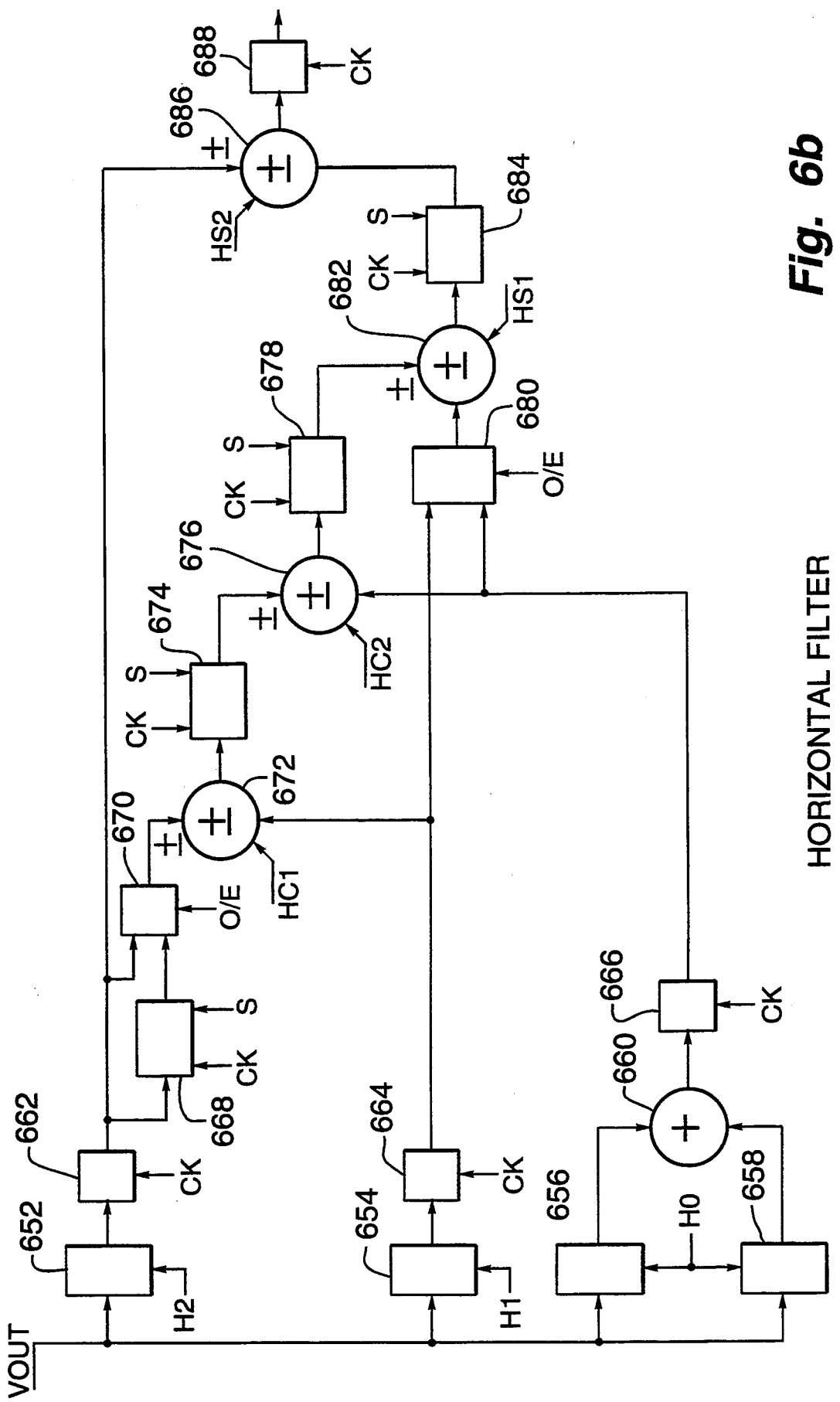

The register 404, as well as registers 406, 408, 410 and 412 are responsive to the system clock signal CK to synchronize input pixel values from the signal IN' and the pixel values provided by the three-state gates 112a–112d as the output signals of the tapped delay line to the system clock signal CK. The pixel values in the register 404 are applied to the three-state gate 112a and to one input port of a multiplexer 426. The output signal of the multiplexer 426 is a signal DATA0, which, as described below with reference to FIGS. 6, 6a and 6b, is the undelayed input signal to the processor 118.

Data provided by the register 404 is also provided directly to respective input ports of three multiplexers 414, 416 and 418 and through shifters 420, 422 and 424 to other respective input ports of the three multiplexers. One input port of each of the three multiplexers 420, 422 and 424 is connected to a source of reference potential, e.g. ground. This connection effectively applies zero-valued pixels to the respective input ports. A fourth input port of each of the multiplexers 414, 416 and 418 is coupled to receive data from the memory 114, through a respective three-state gate 112a, 112b or 112c and a respective synchronous register 406, 408 or 410. The output ports of the multiplexers 414, 416 and 418 are coupled to the three state gates 112b, 112c and 112d, respectively. In normal operation, the only input ports of the multiplexers which are used are those coupled to the synchronous registers 406, 408 and 410. The other input ports of the multiplexers are used to test the memory 114.

In FIG. 1, the three-state gates 112a–112d each provide and receive a separate eight-bit portion of the 32-bit words which are stored in the memory 114. Memory 114 is arranged as a 32-bit by 1024 word memory in which all 32 bits of each word are read and written simultaneously. The memory is controlled by timing circuitry 128 which generates the clock signals for the IC. Circuitry 128 is responsive to the SYNC ALL signal provided by the processor 106. Circuitry 128 generates memory clock signals MC1 and MC2 only when the signal SYNC ALL indicates that active pixel data or border data are being provided by the vertical edge processor 106. Here MC2 is delayed by between 10 nanoseconds (ns) and one-quarter of one clock period with respect to the signal MC1.

The signal MC1 is also applied to address counter 116. Counter 116 generates sequential address values for the memory 114. The counter 116 increments its address value by one for each pulse of the clock signal MC1 occurring while the horizontal component of SYNC ALL is logic-high. At the end of an active horizontal line, that is to say, when the signal SYNC ALL becomes logic-low, the counter value is reset to zero. In spread-tap mode, the counter 116 is reset only at the end of alternate line intervals. Thus, in this mode, the memory 114 holds samples representing eight lines of the image. The number of samples in a single line of the image, however, is limited to 512 when the IC is operating in this mode.

For each address value provided by the counter 116, the memory 114 first provides a 32-bit data word to the three-state gates 112a–112d and then stores a 32-bit data word provided by the three-state gates into the addressed memory location. In FIG. 5, the three-state gates provide data to the processor 108, via buffer circuit 512, during the first half of the memory cycle and receive data from the processor 108 during the second half of the memory cycle, responsive to an enable signal, TSEN, provided by the timing circuitry 128.

In FIG. 4, it is noted that between the read and write operations for a single memory address, the registers 406, 408, 410 and 412 and the multiplexers 414, 416 and 418 shift the data provided by the memory 114 down by one-byte. The eight-bit byte provided by the three-state gate 112a is routed through the register 406 and multiplexer 414 to be written back into the memory 114 through the three-state gate 112b. Similarly, the byte provided by gate 112b is written in the third byte position, via three-state gate 112c and the byte provided by gate 112c is written in the fourth position via gate 112d. The first byte position in the 32-bit word that is written into the memory 114 is filled by the input signal IN' provided via the register 404.

Operating in this manner, the memory 114, timing circuitry 128, three-state gates 112a–112d and the processor 108 implement a tapped four-line delay line where the number of samples in each line may change dynamically.

The eight-bit sample values provided by the synchronous registers 404, 406, 408, 410 and 412 are applied to the convolution processor 118 as the five taps DATA0, DATA1, DATA2, DATA3 and DATA4 of the vertical delay line. The samples from the registers 404, 406, 410 and 412 are applied to the convolution processor through respective multiplexers 426, 428, 430 and 432. These multiplexers are controlled by signals SEL0, SEL1, SEL3 and SEL4 provided by the horizontal synchronizer 402 to implement various edge effects for the top and bottom edges of the image.

The counter 116 is independent of the vertical component of the signal SYNC ALL. Thus, while the vertical edge processor 106 provides the constant value K1 during the vertical blanking interval, the horizontal edge processor 108 stores lines of constant pixel values into the memory 114. If a constant-valued top or bottom edge is required, the multiplexers 426, 428, 430 and 432 simply pass the respective signals provided by the registers 404, 406, 410 and 412 while the signal provided by the register 408 is applied to the processor 118 directly.

When it is desired to repeat the top line of the image in the upper edge area, two lines of image data are loaded into the memory 114 and, as the third line of image data is being loaded, the horizontal synchronizer 402 conditions the multiplexers 430 and 432, via the signals SEL3 and SEL4, to apply the sample values which are currently being provided by the register 408 (i.e. DATA2) to the processor 118. During the next line interval, the synchronizer 402 conditions the multiplexers 430 and 432, via the signals SEL3 and SEL4 to provide the sample values from the register 410. In the next line interval, and for each successive line interval until the bottom of the image, each of the multiplexers 426, 428, 430 and 432 applies the sample values provided by the respective registers 404, 406, 410 and 412 to the processor 118.

The repeated line border for the bottom of the image is implemented in a similar manner. In the first line interval after the last image line has been provided by the edge processor 106, the horizontal synchronizer 402 conditions the multiplexer 426 to provide the output of the multiplexer 428 as the signal DATA0. Similarly, during the next line interval, the synchronizer 402 causes both of the multiplexers 426 and 428 to provide the output samples of the register 408 as the signals DATA0 and DATA1.

FIG. 4a is a block diagram of a circuit for the horizontal synchronizer 402. This circuit produces horizontal and vertical timing signals which are compensated for pixel data processing delays through the horizontal edge processor. In addition, the circuitry provides vertical timing signals for each of the four delayed lines of samples provided by the three-state gates 112a–112d.

In FIG. 4a, the vertical timing signal, VA', and the horizontal timing signal, HA', of the input signal IN' are applied to respective flip-flops 450 and 452. These flip-flops are clocked by complementary phases of the system clock signal CK to provide the respective signals with a compensating delay of one clock period to match the pixel data propagation delay through the registers 404–412 of the horizontal edge processor 108. The delayed HA' signal is provided as the signal HA" by the flip-flop 452.

The delayed signal VA' is applied to a delay element 456a, the first of a series of 9 delay elements 456a–456i. The delay elements are clocked by a line-active signal, LA, which is aligned with the signal HA" via the flip-flop 454. In this embodiment, the signal LA is a pulse signal which occurs at the start of each line interval as defined by the signal HA'. In this configuration, each of the delay elements 456a–456i provides a vertical timing signal which is delayed by one horizontal line interval, with respect to the timing signal provided by the previous delay element.

Four of these delayed vertical timing signals, the output signals provided by the delay elements 456a through 456d, are provided to a multiplexer 458 as a first set of four vertical timing signals. In addition, a second set of four timing signals, the output signals of the delay elements 456c through 456e, are provided to the multiplexer 458. The second set of timing signals is delayed by two horizontal line intervals with respect to the first set of timing signals. The multiplexer 458 is conditioned by a signal VS to select one of these two sets of timing signals as the vertical timing signals VA1, VA2, VA3 and VA4 for the four lines of delayed pixel values provided by the three-state gates 112a–112d. If the filter is operating in spread-tap mode, the second set of timing signals is provided. In all other operational modes, the first set of signals is provided.

The horizontal synchronizer 402 also includes control circuitry 460 which is responsive to a portion of the signal CONT provided by the main control circuitry 103 to generate the signal VS and the signals SEL0, SEL1, SEL3 and SEL4 which, as described above, control the multiplexers 426, 428, 430 and 432 of the processor 108 shown in FIG. 4. The signal CONT includes, for example, state variables which indicate whether the filter is operating in spread-tap mode and whether a horizontal edge effect has been selected. The control circuitry 460 monitors the output signals of the delay elements 456a, 456b, 456c, 456d, 456f, 456g and 456i.

In FIG. 4, the vertical timing signal VA2 is concatenated with the horizontal timing signal HA" to produce a two-bit timing signal HVA". As described below with reference to FIGS. 6, 6a and 6b, this signal is used as the compensated timing signal for the processor 118.

In FIG. 1, the signal HA" is combined with each of the four vertical timing signals VA1, VA2, VA3 and VA4 provided by the horizontal synchronizer 402 of the horizontal edge processor 108. These four timing signals are, in turn, concatenated to respectively different ones of the four delayed signals provided by the three-state gates 112a–112d through the processor 108. These delayed signals with compensated timing signals are applied to respectively different data input ports of a multiplexer 120. Other data input ports of the multiplexer 120 are coupled to receive a constant value K2 and the signal IN2' provided by the input element 102.

The signal HVA", the undelayed pixel signal, DATA0, and the four line-delayed pixel signals, DATA1, DATA2, DATA3 and DATA4, provided by the processor 108 are applied to respectively different input ports of the processor 118. Suitable circuitry is shown in FIGS. 6, 6a and 6b.

The processor 118 is a two-dimensional symmetrical filter having a separable kernel. Mathematically, the transfer function, G(x,y), of the filter may be described by:

$$G(x,y) = \Sigma_i w_x(i) \Sigma_j w_y(j) I(x+i, y+j) \qquad (1)$$

where I(x,y) are the image pixels; $w_x(i)$ are the horizontal coefficients; $w_y(j)$ are the vertical coefficients, $x=0, 2, \ldots N$; $y=0, 1, \ldots M$; $i=(0, 1, \ldots n-1)-(n-1)/2$ and $j=(0, 1, \ldots m-1)-(m-1)/2$. Here the value of n and N may be either 4 or 5 and the value of m and M may also be either 4 or 5.

The filter is symmetrical if $w_x(i) = w_x(-i)$ and $w_y(j) = w_y(-j)$. If $w_x(i) = -w_x(-i)$ and $w_y(-j)$, then the filter is antisymmetric. I have determined that a five-tap binomial filter is sufficient for substantially all applications in which a Gaussian pyramid is constructed. A binomial filter has coefficients of {1, 4, 6, 4, 1}/16 for both the horizontal and vertical filters. The coefficients of the binomial filter may be implemented using simple shift-and-add techniques. Thus, the filter does not need complex hardware multipliers.

A small amount of additional circuitry is preferably added to the filter to increase its flexibility. The filter can then be programmed to have the combinations of filter coefficients indicated by equations (2) and (3). Note that each filter coefficient must have the same magnitude as its symmetrical coefficient, but it may differ in sign.

$$w_x = \{\pm h_2, \pm h_1, h_0, \pm h_1, \pm h_2\} \qquad (2)$$

$$w_y = \{\pm v_2, \pm v_1, v_0, \pm v_1, \pm v_2\} \qquad (3)$$

where:

$h_0, v_0 \in \{0, \frac{1}{8}, \frac{1}{4}, \frac{3}{8}, \frac{1}{2}, \frac{5}{8}, \frac{3}{4}, \frac{7}{8}, 1\}$ $h_1, v_1 \in \{0, \frac{1}{8}, \frac{1}{4}, \frac{1}{2}\}$ $h_2, v_2 \in \{0, 1/16, \frac{1}{8}, \frac{1}{4}\}$ Using these coefficients, the filter can be programmed to realize a number of different odd tap-number filters. In addition, by asserting an odd-even control signal (O/E) the filter can be programmed as a number of different even tap-number filter in accordance with equations (4) and (5).

$$w_x = \{\pm h_2, \pm h_0, h_0, \pm h_2\} \quad (4)$$

$$w_y = \{\pm v_2, v_0, \pm v_0, \pm v_2\} \quad (5)$$

As described above, the processor 118 can also be programmed to operate in "spread-tap" mode. In this mode, the five-by-five tap filter is expanded to a nine-by-nine tap filter by inserting zero-valued weights between successive coefficients. Formally, this is described by:

$$G(x,y) = \Sigma_i w_x(i) \Sigma_j w_y(j) I(x+2i, y+2j) \quad (6)$$

The spread-tap mode is used to generate pyramid levels having increased sample density. This mode is implemented by adding interstitial delay elements in the horizontal filter and storing two image lines in each delay line in the memory 114. Since the delay lines are 1024 pixels in length, images which may be processed by a spread-tap filter are limited to a maximum horizontal size of 512 pixels.

The processor 118 may also be programmed to switch between two sets of horizontal coefficients and two sets of vertical coefficients. The horizontal coefficients are switched at a pixel rate while the vertical coefficients are switched at a line rate. In this mode, the output samples provided by the filter represent four different filter results: $F^{oo}$, $F^{oe}$, $F^{eo}$ and $F^{ee}$ where the first superscript defines the odd/even phase of the horizontal filter and the second superscript defines the odd/even phase of the vertical filter. Circuitry external to the pyramid IC can be designed to unscramble the interleaved output samples and to store the four filter results in four quadrants of a frame store memory.

By selecting, for example, a set of even-phase coefficients which define a high-pass filter transfer function and a set of odd-phase coefficients which define a low-pass filter transfer function, the IC and the external circuitry can separate an image into four filtered and subsampled images: 1) an image representing the low spatial frequencies, 2) an image representing horizontal high spatial frequencies, 3) an image representing vertical high spatial frequencies and 4) an image representing diagonal high spatial frequencies. This type of filtering may be useful for subband coding.

FIG. 6 is a block diagram showing the processor 118 in simplified form. Processor 118 includes a vertical filter 602 which receives the signals DATA0, DATA1, DATA2, DATA3 and DATA4 provided by the edge processor 108 and produces a vertically filtered signal, VOUT, which is applied to a horizontal filter 604. The filters 602 and 604 are coupled to receive control signals and state variables from control circuitry 606. The circuitry 606, in turn, is responsive to a portion of the control signal CONT provided by the main control circuitry 130 shown in FIG. 1. The horizontal and vertical timing signals, HVA", are applied to separate vertical and horizontal delay elements 608 and 610, which compensate the timing signals for delays in processing the image pixels. The delayed timing signals are combined with the output signal provided by the horizontal filter 604 to produce the filter output signal, FOUT, which is applied to the clip processor 122 in FIG. 1.

FIG. 6a is a block diagram of an output weighted FIR filter suitable for use as the vertical filter 602. The filter includes three multiplexers, 624, 626 and 632, which are used to switch the filter between a odd-tap mode and an even-tap mode. For the sake of brevity, only the odd-tap mode is described in detail. The even tap mode is implemented by switching the signal passed by each of the multiplexers.

In FIG. 6a, the signal DATA0 is applied to one input port of an adder/subtracter 620. The signal DATA4, through the multiplexer 626, is applied to the other input port. The adder/subtracter 620 may be programmed using the signal VS1 to either add DATA0 to DATA4 or subtract DATA0 from DATA4. If VS1 is selected to subtract DATA0 from DATA4, then the $v_2$ coefficients are antisymmetric otherwise they are symmetric.

The output samples provided by the adder/subtracter 620 are applied to a programmable shifter 628 which shifts the samples to less significant bit positions by two, three or four bits to effectively multiply the samples by factors of $\frac{1}{4}$, $\frac{1}{8}$ or 1/16, respectively. This shifter implements the $v_2$ filter coefficients. In addition, the shifter can be programmed to provide a zero-valued pixel, effectively multiplying the samples by zero.

The input signal DATA1 is applied to one input port of an adder/subtracter 622, the other input port of which is coupled to receive the signal DATA3, provided by the multiplexer 624. The adder/subtracter 622 may be programmed via the control signal VS2 either to add DATA1 to DATA3 ($v_1$ symmetric) or to subtract DATA1 from DATA3 ($v_1$ antisymmetric). The output signal of the adder 622 is scaled by factors of $\frac{1}{2}$, $\frac{1}{4}$, $\frac{1}{8}$ or 0 by the programmable shifter 630. This shifter implements the $v_1$ coefficients.

The signal DATA2 is applied in parallel to two shift registers, 634 and 636. The output signals provided by these shift registers are summed by an adder 642. The combination of the two shifters 634 and 636 and the adder 642 allow the signal DATA2 to be scaled by factors of 1, $\frac{3}{4}$, $\frac{5}{8}$, $\frac{1}{2}$, $\frac{3}{8}$, $\frac{1}{4}$, $\frac{1}{8}$ or 0.

The output signals of the shifters 628 and 630 and the output signal of the adder 642 are applied to respective synchronizing delay elements 638, 640 and 646. These delay elements are responsive to the system clock signal, CK, to align the various scaled and summed sample values in time. The samples provided by the delay elements 638 and 640 are applied to respective input ports of a programmable adder/subtracter 644. This device may be programmed, via the signal VC2, to either add the output signals of delay elements 638 and 640 or to subtract the output of 630 from that of 640.

The output signal of the adder/subtracter 644 is applied to one input port of an adder/subtracter 648, the other input port of which is coupled to receive the scaled DATA2 signal provided by the delay element 646. The adder/subtracter 648 may be programmed to add the signal from adder/subtracter 644 to the signal provided by delay element or to subtract it from the signal provided by delay element 646, responsive to a signal VC1. The output signal of the adder/subtracter is applied to a synchronizing delay element 650 which produces the vertically filtered output signal, VOUT.

The magnitude of the vertical coefficients is determined by the signals $v_0$, $v_1$ and $v_2$ while their signs and symmetry are determined by the signals VS1, VS2, VC1 and VC2 which control the respective adder/subtracters 620, 622, 648 and 644. The relationship between the control signals and the coefficient signs is shown in TABLE 3.

TABLE 3

| VS1 | VS2 | VC1 | VC2 | v₂ | v₁ | v₀ | v₁ | v₂ |
|---|---|---|---|---|---|---|---|---|
| 0 | 0 | 0 | 0 | + | + | + | + | + |
| 0 | 0 | 0 | 1 | − | − | + | − | − |
| 0 | 0 | 1 | 0 | − | + | + | + | − |
| 0 | 0 | 1 | 1 | + | − | + | − | + |
| 0 | 1 | 0 | 0 | + | − | + | + | + |
| 0 | 1 | 0 | 1 | − | + | + | − | − |
| 0 | 1 | 1 | 0 | − | − | + | + | − |
| 0 | 1 | 1 | 1 | + | + | + | − | + |
| 1 | 0 | 0 | 0 | − | + | + | + | + |
| 1 | 0 | 0 | 1 | + | − | + | − | − |
| 1 | 0 | 1 | 0 | + | + | + | + | − |
| 1 | 0 | 1 | 1 | − | − | + | − | + |
| 1 | 1 | 0 | 0 | − | − | + | + | + |
| 1 | 1 | 0 | 1 | + | + | + | − | − |
| 1 | 1 | 1 | 0 | + | − | + | + | − |
| 1 | 1 | 1 | 1 | − | + | + | − | + |

FIG. 6b is a block diagram of an input-weighted FIR filter suitable for use as the horizontal filter 604 of FIG. 6. This filter includes two multiplexers 670 and 680 which may be operated to switch the filter between odd and even tap modes. As with the vertical filter, only the odd-tap mode is described below. The even-tap mode is implemented by conditioning both of the multiplexers 670 and 680 to pass the other one of their data input signals.

Samples of the signal VOUT provided by the vertical filter 602 are applied in parallel to four shifters 652, 654, 656 and 658. Shifter 652 implements the h₂ coefficient value. It may be programmed to shift the VOUT sample values by two, three or four bits toward bit positions of lower significance to effectively multiply the sample values by ¼, ⅛ and 1/16, respectively. In addition, shifter 652 may be conditioned to provide a zero sample value, effectively multiplying the VOUT sample value by zero.

Shifter 654, which implements the h₁ coefficient value, may be programmed to shift the VOUT sample values toward less significant bit positions by one, two or three bits to effectively multiply the sample values by ½, ¼ and ⅛, respectively. Shifter 654 may also be conditioned to provide a zero sample value.

The combination of the two shifters 656 and 658 and an adder 660 are used to implement the h₀ coefficient value. These three components may be programmed to implement coefficient values of 1, ⅞, ⅝, ½, ⅜, ¼, ⅛ and 0.

The digital sampled data signals provided by the shifters 652 and 654 and by the adder 660 are applied to respective synchronizing delay elements 662, 664 and 666. These delay elements, which are clocked by the system clock signal CK, align the three sampled data signals to a common clock transition.

The signals provided by the delay element 662 are applied to a programmable delay element 668. This delay element is controlled by a signal S to delay the samples provided by the delay element 668 by two periods of the signal CK if the pyramid IC is in spread-tap mode and by one period of the signal CK otherwise. The output signal of the delay element is applied, through the multiplexer 670, to one input port of an adder/subtracter 672.

The other input port of the adder/subtracter 672 is coupled to receive the signal provided by the delay element 664. The adder/subtracter 672 is controlled by a signal HC1 to either add the output signal of the multiplexer 670 to, or subtract it from the output signal of the delay element 664. The output signal of the adder/subtracter 672 is delayed by one or two sample periods by a delay element 674. This delay element is also responsive to the signal S to delay samples by two clock periods when the pyramid IC is in spread-tap mode.

The signal provided by the delay element 674 is applied to one input port of an adder/subtracter 676, the other input port of which is coupled to receive the output signal provided by the delay element 666. The adder/subtracter 676 may be programmed to either sum the output signals of the two delay elements or to subtract the output of delay element 674 from the output of delay element 666. This signal is applied to a delay element 678 which, responsive to the spread-tap signal S, delays the signal by one or two periods of the system clock signal CK.

The output signal of the delay element 678 is applied to one input port of an adder/subtracter 682, the other input port of which is coupled to receive the signal provided by the delay element 664 via the multiplexer 680. The adder/subtracter 682 is responsive to a control signal HS1 to either add the output signal of the multiplexer 680 to the output signal of the delay element 678 or to subtract the output signal of the multiplexer 680 from the output signal of the delay element 678. The signal produced by the adder/subtracter 682 is delayed, responsive to the signal S, by one or two periods of the signal CK by a programmable delay element 684.

The output signal of the delay element 684 and the output signal of the delay element 662 are applied to respective input ports of an adder/subtracter 686. This adder subtracter is controlled by a signal HS2 to either add the output signal of the delay element 662 to that of the delay element 684 or to subtract the output signal of the delay element 662 from the output signal of the delay element 684. The output signal of the adder/subtracter 686 is synchronized to the system clock signal CK by a synchronizing delay element 688. The signal provided by this delay element is the output signal of the horizontal filter 604, shown in FIG. 6.

The programmable shifters 652, 654, 656 and 658 determine the magnitude of the horizontal coefficients h₂, h₁ and h₀. The signals HC1, HC2, HS1 and HS2 determine the signs of these coefficients. The relationship between the signals HC1, HC2, HS1 and HS2 and the coefficients h₂, h₁ and h₀ is illustrated in TABLE 4.

TABLE 4

| HC1 | HC2 | HS1 | HS2 | h₂ | h₁ | h₀ | h₁ | h₂ |
|---|---|---|---|---|---|---|---|---|
| 0 | 0 | 0 | 0 | + | + | + | + | + |
| 0 | 0 | 0 | 1 | − | + | + | + | + |
| 0 | 0 | 1 | 0 | + | − | + | + | + |
| 0 | 0 | 1 | 1 | − | − | + | + | + |
| 0 | 1 | 0 | 0 | + | + | + | − | − |
| 0 | 1 | 0 | 1 | − | + | + | − | − |
| 0 | 1 | 1 | 0 | + | − | + | − | − |
| 0 | 1 | 1 | 1 | − | − | + | − | − |
| 1 | 0 | 0 | 0 | + | + | + | + | − |
| 1 | 0 | 0 | 1 | − | + | + | + | − |
| 1 | 0 | 1 | 0 | + | − | + | + | − |
| 1 | 0 | 1 | 1 | − | − | + | + | − |
| 1 | 1 | 0 | 0 | + | + | + | − | + |
| 1 | 1 | 0 | 1 | − | + | + | − | + |
| 1 | 1 | 1 | 0 | + | − | + | − | + |
| 1 | 1 | 1 | 1 | − | − | + | − | + |

Referring to FIG. 6, the vertical and horizontal compensating delay circuits 608 and 609 delay the composite timing signal HVA" to match the pixel processing delay through the respective vertical and horizontal filters 602 and 604. The vertical compensating delay circuit delays the timing signals by two periods of the system clock signal, CK, to compensate for the two stages of delay imparted by the synchronizing delay elements in the vertical filter. Referring to FIG. 6a, delay elements 638, 640 and 642 provide the first stage of delay and the delay element 650 provides the second stage of delay.

Similarly, the horizontal compensating delay element 609 delays the composite timing signal provided by the vertical delay circuit 608 by four periods of the system clock signal, CK (six periods when the pyramid IC is operating in spread-tap mode). This delay matches the pixel delay for the center tap through the horizontal filter. In FIG. 6b, the center tap delay includes the delay elements 666, 678, 684 and 688. In spread-tap mode, the delay elements 678 and 684 each add one clock period of delay. Thus in spread-tap mode, the compensating delay provided by the horizontal delay element 610 becomes six periods of the signal CK. In FIG. 6, the compensated timing signals are combined with the output signal of the horizontal filter 604 to produce a signal FOUT which is the output signal of the convolution processor 110.

The signal FOUT and a clip control signal, CLICTL, generated by the control circuitry 606 of the processor 118, are applied to the clip processor 122 in FIG. 1. The processor 122 also accepts the external input signal IN3. This input signal may be combined with the signal FOUT to produce a sixteen-bit double-precision sampled data output signal. A system which produces a sixteen-bit output signal is described below.

Figure 7:
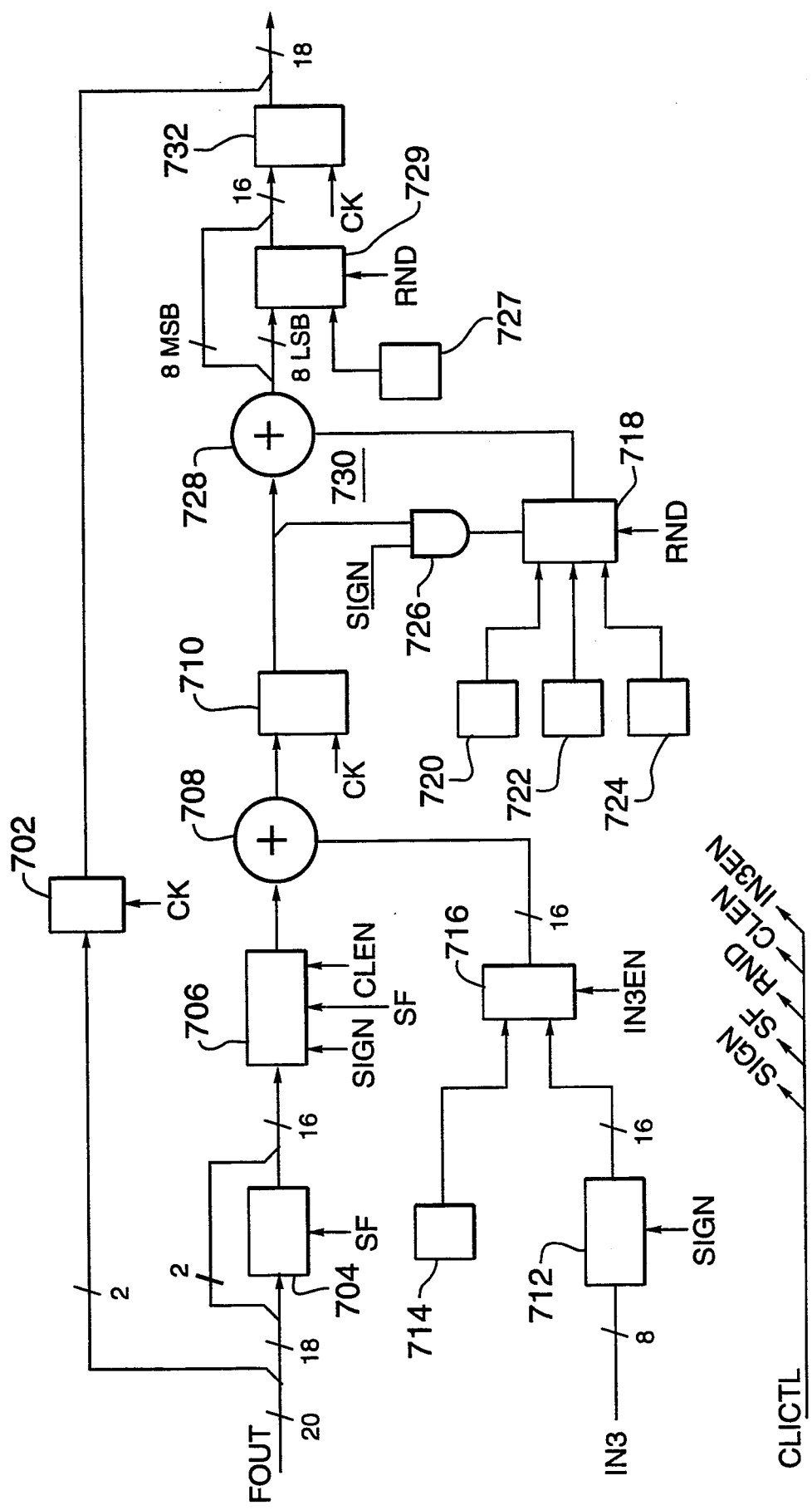
FIG. 7 is a block diagram of a clip processor for use in the IC of FIG. 1.

FIG. 7 is a block diagram, partly in logic diagram form of circuitry for use as the processor 122. To avoid losing discrete signal resolution, the signal FOUT, generated by the processor 118 is a 20-bit signal which includes a two-bit timing signal and an 18-bit data signal. The 18-bit data signal includes a 16-bit value, a sign bit and a guard bit. The two-bit timing signal is applied to a compensating delay element 702 through which it is delayed by two periods of the system clock signal CK. This delay compensates for the synchronizing delay elements 710 and 730 in the processor 122.

The 18-bit data signal is applied to a programmable shifter 704. The shifter 704 is responsive to a control signal, SF, provided as a part of the signal CLICTL, to shift the samples by one bit toward more significant bit positions or by zero, one or two bits toward less significant bit positions. Thus, the shifter 704 may be programmed to effectively scale the signal produced by the convolution processor by a factor of ¼, ½, 1, or 2. The sign and guard bits are passed around the shifter 704.

The scaled signal provided by the shifter 704, together with the passed sign and guard bits, is applied to underflow/overflow circuitry 706. This circuitry is responsive to the scale factor signal, SF, as well as to the enable signal, CLEN, and a signal SIGN which indicates whether the sample values are unsigned or signed twos complement values. For unsigned values, the circuitry 706 detects the overflow condition (i.e. guard bit equals 1 and SF>0) and replaces any samples exhibiting overflow with a value representing the largest possible unsigned sample value (i.e. 65,535). For signed values, the circuitry detects positive overflow and negative overflow (also called underflow) conditions and replaces the samples with the respective largest positive and negative values (i.e. 32,767 and −32,768).

The overflow/underflow circuitry 706 produces a 16-bit data value which is applied to one input port of an adder 708, the other input port of which is coupled to receive a 16-bit value provided by a multiplexer 716. The multiplexer 716, in turn, is coupled to a source of zero valued pixels 714 and to an eight-to-sixteen bit converter 712 which produces a sixteen-bit value in which the eight least significant bits (LSBs) are occupied by the value provided to the pyramid IC via the input signal IN3. The converter 712 is responsive to the signal SIGN to sign-extend the eight-bit value when it is a twos complement value.

The multiplexer 716 is responsive to an enable signal, IN3EN to pass either the zero-valued 16-bit pixels from the source 714 (IN3EN=0) or to pass the 16-bit pixels provided by the converter 712 (IN3EN=1). The adder 708 sums the two 16-bit values to produce a 16-bit value which is synchronized to the system clock signal CK via a register 710. The values in the register are then applied to rounding circuitry 730 which, if the control signal RND is set, rounds the 16-bit values to produce eight-bit values. If RND is reset, the circuitry 730 passes the 16-bit values provided by the register 710 to a second synchronizing register 732.

In the rounding circuitry 730, the 16-bit data values provided by the register 710 are applied to one input port of an adder 728, the other input port of which is coupled to receive a value of one-half, zero or minus one-half from a multiplexer 718. If RND is reset, the multiplexer 718 passes the zero value from a source 722. and the multiplexer 729 passes the 16 bits provided by the adder 728.

The rounding circuitry assumes that the eight most significant bits (MSBs) of each 16-bit value are the integer portion of the value and the eight LSBs represent the fractional portion. If the data is unsigned and the rounding circuitry is enabled (RND=1), the multiplexer 729 passes a value of one-half from a source 720 to the adder 728. The adder 728 sums this value and the 16-bit values provided by the register 710. The signal RND also conditions the multiplexer 729 to select the zero value for the eight LSBs of its output signal. Thus, the closest eight-bit integer value to the 16-bit input value is applied to the register 732.

If the data values are twos complement values (SIGN=1) then the multiplexer 718 selects either the value of one-half provided by the source 720 or a value of minus one-half provided by a source 724 to apply to the adder 728. In this instance, the signal RND conditions the multiplexer 729 to pass the eight-bit integers closest in value to the 16-bit input values provided by the register 710. These values are synchronized to the clock signal CK by the register 732.

The two-bit timing signal provided by the delay element 702 is concatenated with the 16-bit values provided by the register 732 to form the 18-bit output signal of the processor 122. In FIG. 1, this output signal is applied to one input port of a multiplexer 126 and to one input port of an ALU 124. The multiplexer 126 is responsive to a portion of the signal CONT provided by the main control circuitry 130 to pass either the signal provided by the processor 122 or a passed-through signal from the vertical edge processor 106 as to a synchronizing register 132. The register 132 aligns the eighteen-bit output signal to the next transition of the system clock signal CK to produce the output signal OUT1 of the IC.

The other input port of the ALU 124 is coupled to receive the output signal of the multiplexer 120. In FIG. 1, the multiplexer 120 is controlled by a portion of the signal CONT to pass either the input signal IN2, a constant value K2 or one of the delayed signals DATA1, DATA2, DATA3 or DATA4, produced by the edge processor 108. The multiplexer 120 includes internal compensating delay elements (not shown) which delay each of the signals DATA1 through DATA4 to compensate for processing delays in the processors 118 and 122. Delay elements in the multiplexer 120 also compensate the signal IN2' for processing delays through the processors 106, 108, 118 and 122. Since some of these processing delays are sensitive to the mode in which the IC is being operated, mode control signals such as HSPREAD are applied to the multiplexer 120 to control the amount of time by which each of the signals is delayed.

All of the pixel data signals applied to the multiplexer 120 are ten-bit signals having eight data bits and two timing bits, the two timing bits for the constant value K2 are taken from the signal DATA2. ALU 124 may be programmed to pass either of its two input signals unmodified, to add the output signal of the multiplexer 120 to the output signal of the processor 122 or to subtract the output signal of the multiplexer from that of the processor 122. The output signal of the ALU 124 is aligned with the system clock signal CK by a synchronizing register 134 to produce the output signal OUT2 of the pyramid IC. Additional one bit control signals are typically applied to ALU 124 to provide scaling of the data by X or 0.5 X and enabling or disabling the clipping of overflow or underflow data.

The control circuitry 130 generates a control signal CONT which is used throughout the IC. The signal CONT is a set of state variables, some of which reside in the control circuitry 130 and some of which reside in the various elements of the pyramid IC. All of the control variables, such as K1, K2, CONSTANT, BYPASS and HSPREAD, are held in registers in the control circuitry 130 and distributed to the remainder of the circuitry via control busses. It is contemplated, however, that values such as K1 and K2, may be stored locally in the elements which use them. All of the state variables are set by the control circuitry 130 using the CBUS and RESET input signals. The CBUS signal is used to address the registers that hold the state variables and to provide data values to be stored in the registers.

The signal CONT is used here to denote all control busses. The particular distribution of control functions via control busses would depend on the implementation of the circuitry in the IC.

The control circuitry 130 also provides the coefficient values $v_0$, $v_1$, $v_2$, $h_0$, $h_1$ and $h_2$ to the processor 118. In response to a state variable TWO-PHASE (not shown), which may be set via the control input channel CBUS, the control circuitry may be conditioned to change between two sets of horizontal coefficient values at the input sample rate and to change between two sets of vertical coefficient values at the input line rate. This facility may be used to implement the multi-phase filter.

To fully describe the IC, it is helpful to describe some systems which may be implemented using the IC. Exemplary systems are shown below in FIGS. 8–11.

Figure 8:
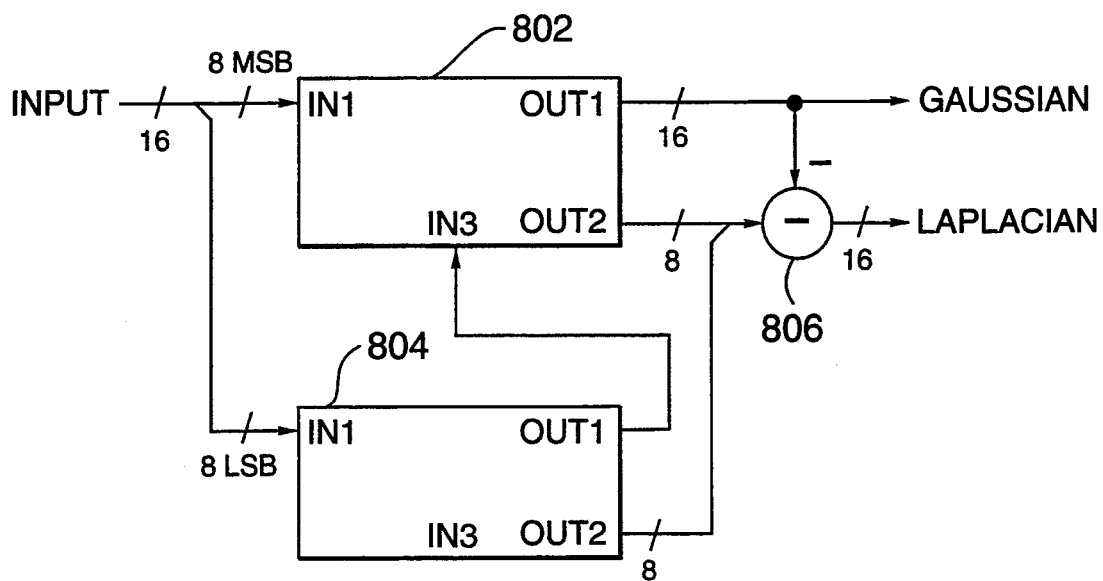
FIGS. 8 through 11 are block diagrams of pyramid processing circuits that include one or more of the ICs of FIG. 1.

FIG. 8 is a block diagram which illustrates how two pyramid ICs may be connected to implement a double precision Gaussian pyramid filter. By adding one external 16-bit subtracter, a double precision Laplacian may be recovered as well. In FIG. 8, the eight MSBs of a 16-bit input signal are applied to a first pyramid IC 802 while the eight LSBs of the signal are applied to a second pyramid IC 804. The convolution processors on both ICs are configured as two-dimensional Gaussian filters. In this implementation, the coefficients of either the horizontal or vertical filter should not sum to a value greater than unity. The OUT1 output signal of the IC 804 is coupled to the input signal IN3 of the IC 802. In this configuration, the OUT1 output signal of the IC 802 is a 16-bit Gaussian filtered image. If the ICs 802 and 804 are both configured to pass their respective DATA2 signals as their respective OUT2 output signals, and the 16-bit Gaussian filtered image is subtracted from the concatenated OUT2 signals using, for example, an external subtracter 806, the signal that is produced is a 16-bit Laplacian for the 16-bit input image signal.

The input signal IN3 is coupled to the processor 122 while the output signal OUT1 has is taken at the output port of the multiplexer 126, after the processor 122. Thus, in FIG. 8, the output signal of the IC 804 is delayed by three periods of the signal CK with respect to the signal from the IC 802 due to these extra processing steps. These are the three sample periods that are compensated for by the input delay element 102, described above with reference to FIG. 2.

Figure 9:
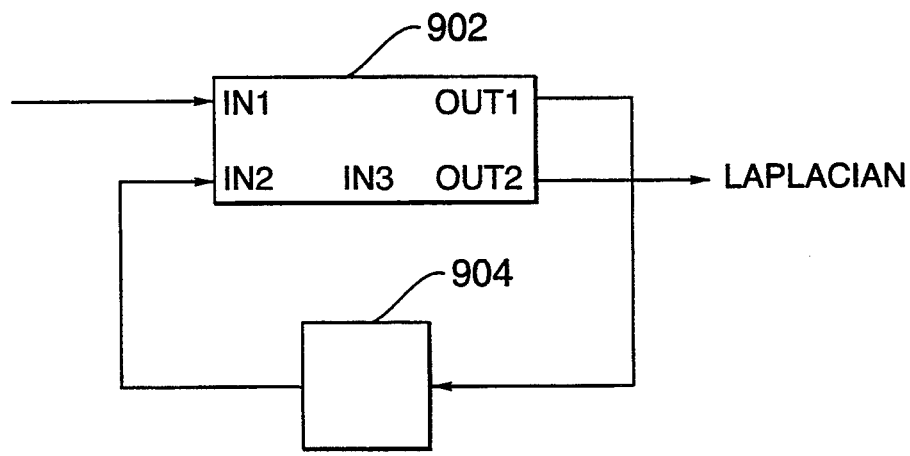

FIG. 9 is a block diagram of the IC used in a standard pyramid filter. As shown in FIG. 9, the pyramid filter uses an IC 902 and a frame store 904. The OUT1 output signal of the IC 902 is coupled to the input port of the frame store 904 while the output port of the frame store 904 is coupled to the input signal IN2 of the IC 902.

In operation, the original image is applied to the IN1 input port of the IC 902. During a first pass, the image data is filtered by a Gaussian filter. The results of this filter are subtracted from the DATA2 signal by the ALU 124 to produce the Laplacian of the image data. The Gaussian filtered data is stored in the frame store 904 while the Laplacian data is provided for storage or processing elsewhere. Ideally, the Gaussian filtered data is subsampled, for example, by discarding every other sample and every other line of samples before it is stored in the frame store 904.

During the subsequent passes, the IC 902 is configured to accept input from the IN2 input terminal; to calculate the Gaussian filtered image and Laplacian image for this data; to provide the Laplacian image for processing elsewhere and to subsample and store the Gaussian image in the frame store 904. For each iteration, the Laplacian image represents spatial frequency components in a one octave band of frequencies of the image. As set forth above, this data may be used to analyze the image or to compress it for transmission to a remote location.

The frame store 904 may be, for example, a conventional dual port memory which uses commercially available memory ICs such as the Hitachi HM53051P.

Figure 10:
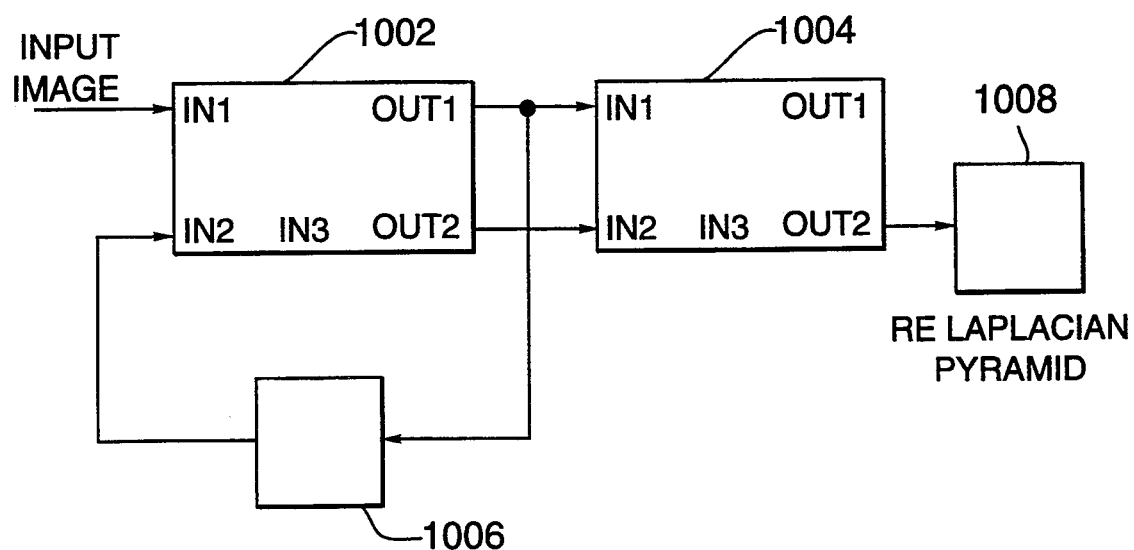

FIG. 10 illustrates a configuration of two pyramid ICs, 1002 and 1004, and two frame stores 1006 and 1008 as a reduce-expand pyramid module. This module may be used for encoding and decoding images for data reduction, image enhancement, noise reduction image merging and other image processing functions where it is desirable to reconstruct an image from a pyramid after some processing is performed on pyramid images.

The procedure for the reduce-expand pyramid starts with a low-pass (Gaussian) filter step implemented in the pyramid IC 1002. The low-pass filtered image signal is subsampled and stored in the frame store 1006. To compute the Laplacian of the image, this stored data would normally be expanded and subtracted from the input signal.

In FIG. 10, this step is simulated by the second pyramid IC 1004. This IC sets every other sample and other line of samples provided by the IC 1002 to zero, interpolates the missing samples and subtracts the result from the original input signal, delayed through the line store memories and horizontal edge processors of the two ICs 1002 and 1004. The zero value insertion is implemented in the processor 106 of FIG. 1. The resulting samples are stored in the frame store 1008 as the Laplacian of the original image. When the first level Laplacian has been computed, the IC 1002 calculates the next level Laplacian from the low-pass filtered image data stored in the frame store 1006, applied to the IC 1002 via the input signal IN2 When the last Laplacian has been calculated, the ICs 1002 and 1004 pass the stored low-pass filtered image from the store 1006 to the store 1008.

Figure 11:
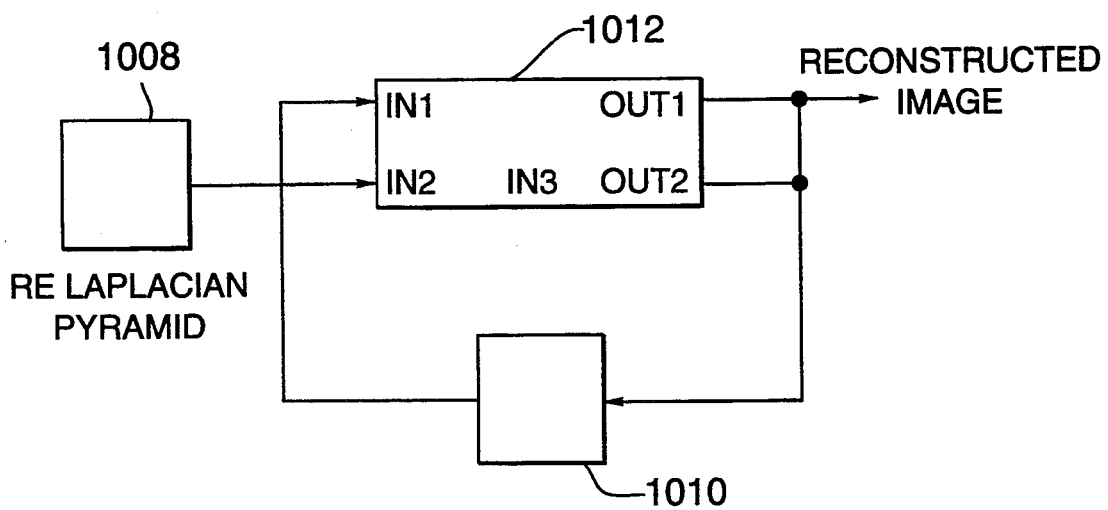

FIG. 11 illustrates a reconstruction pyramid processor which can reproduce the original image from the Laplacian images stored in the store 1008. This processor uses two stores 1008 and 1010, and a pyramid IC 1012. The processor first accesses the stored, lowest resolution, low-pass filtered image from the store 1008 and passes it through IC 1012 to the frame store 1010. Then this image is expanded by store 1010, replicating all pixels and lines once. The IC 1012 then inserts zeros in every other pixel and every other line and interpolates the missing pixel values. This filtered signal is added to the stored Laplacian from store 1008 for the lowest level and the output is stored in the store 1010. This stored image is then expanded, filtered and added to the Laplacian image for the next higher level. The remaining Laplacian images are processed in this manner until the original image is reconstructed.

Depending on the processing speed of the devices, additional compensating delays may be required in certain of the signal paths. One skilled in the art of digital IC design would know where such delays would be needed in a particular system.

The pyramid IC is typically formed on a single semiconductor substrate, preferably silicon, using standard semiconductor growth, deposition and photolithography techniques. Elements of the IC can be formed using well known MOS and/or CMOS and bipolar transistor fabrication technology and, preferably, using standard cells of these components.

Although the present invention has been described in terms of an exemplary embodiment, it is contemplated that it may be practiced as outlined above with modifications within the spirit and scope of the appended claims. For example, the exemplary embodiment is described in terms of a two dimensional filter. It is clear that a one dimensional filter is equally within the scope of the invention.

What is claimed:

1. A pyramid processor comprising:
   means for receiving a first and a second digital data input signal, each including a data signal component and a timing signal component;
   first means, responsive to a first control signal, for selectively combining the respective data signal components of the first and second digital data signals to generate a third digital data signal, and for delaying and selectively combining the respective timing signal components of the first and second digital data signals to compensate for delays incurred in processing the first and second data signals and for combining the compensated timing signal with the third digital data signal;
   two-dimensional digital filter means, including first and second component filters, each of said component filters having a respective tapped delay line, for processing the data signal component of the third digital data signal in accordance with a programmed transfer function to produce a first filtered signal;
   means, coupled to the two-dimensional filter for delaying the timing signal component of the third digital data signal to compensate for processing delays incurred by the filtering of the third digital data signal;
   means coupled to the filter means to receive the filtered signal and an unfiltered signal provided by the tapped delay line of the first component filter and responsive to a second control signal to selectively combine the filtered signal and the unfiltered signal to produce a second filtered signal; and
   control means, responsive to a programming signal to generate the first and second control signals.

2. A pyramid processor according to claim 1, wherein:
   the first and second component filters are mutually orthogonal.

3. A pyramid processor according to claim 2, wherein:
   the two-dimensional digital filter includes first and second sets of programmable coefficient values for the respective first, and second mutually orthogonal component filters; and
   the control means is responsive to the programming signal to program the first and second sets of coefficient values.

4. A pyramid processor of claim 3 further comprising:
   means for applying an auxiliary digital data input signal; and
   means, coupled to the means for applying the auxiliary input signal and to the digital filter means, for combining each sample of the auxiliary signal with L less significant bits of each sample of the filtered signal where each sample of the filtered signal has K bits, K and L being integers and L being greater than K.

* * * * *